US012647707B2

(12) United States Patent
Lee

(10) Patent No.: US 12,647,707 B2
(45) Date of Patent: Jun. 2, 2026

(54) DISPLAY APPARATUS AND METHOD FOR DRIVING THEREOF, AND SOUND APPARATUS AND DISPLAY APPARATUS INCLUDING THE SAME

(71) Applicant: LG Display Co., Ltd., Seoul (KR)

(72) Inventor: Sungtae Lee, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 273 days.

(21) Appl. No.: 18/545,357

(22) Filed: Dec. 19, 2023

(65) Prior Publication Data

US 2024/0223931 A1 Jul. 4, 2024

(30) Foreign Application Priority Data

Dec. 30, 2022 (KR) ........................ 10-2022-0190560

(51) Int. Cl.
*H04R 1/02* (2006.01)

(52) U.S. Cl.
CPC .................................... *H04R 1/028* (2013.01)

(58) Field of Classification Search
CPC ........................... H04R 1/028; H04R 2499/11; H04R 2499/15; H04R 5/02; H04R 5/04; H04R 2205/021
USPC .................................................. 381/388, 306
See application file for complete search history.

(56) References Cited

U.S. PATENT DOCUMENTS

2014/0196142 A1* 7/2014 Louboutin ............ H04L 63/101 726/16
2014/0328506 A1* 11/2014 Banks ...................... H04R 5/02 381/303
2015/0341714 A1* 11/2015 Ahn ....................... H04R 7/045 381/333
2017/0168772 A1* 6/2017 Lim ........................ G06F 3/165
2022/0086579 A1* 3/2022 Holstrom ................. H04R 3/00

FOREIGN PATENT DOCUMENTS

WO WO-2020235699 A1 * 11/2020 ............... H04S 7/30

* cited by examiner

*Primary Examiner* — Ahmad F. Matar
*Assistant Examiner* — Sabrina Diaz
(74) *Attorney, Agent, or Firm* — Fenwick & West LLP

(57) ABSTRACT

A display apparatus comprises a display member including a display panel having a plurality of pixels that are configured to display an image, a sound output device configured to output sound, and an input/output interface configured to be connected to an external sound apparatus via wire, the sound output device and the external sound apparatus are configured to output sound according to a sound mode responsive to the external sound apparatus being connected to the input/output circuit via the wire.

24 Claims, 7 Drawing Sheets

S120: S121, S122, S123    S220: S221, S222, S223    S320: S321, S322, S323

DISPLAY APPARATUS AND METHOD FOR DRIVING THEREOF, AND SOUND APPARATUS AND DISPLAY APPARATUS INCLUDING THE SAME

CROSS-REFERENCE TO RELATED APPLICATION

This application claims the benefit of and priority to Republic of Korea Patent Application No. 10-2022-0190560 filed on Dec. 30, 2022, which is hereby incorporated by reference in its entirety.

BACKGROUND

Technical Field

The present disclosure relates to a display apparatus and a method for driving thereof, and a sound apparatus and a display apparatus including the same.

Description of the Related Art

A display apparatus is equipped in electronic devices or home appliances, such as televisions (TVs), monitors, notebook computers, smartphones, tablet computers, electronic pads, wearable devices, watch phones, portable information devices, navigation devices, automotive control display devices, or the like, and are used as a screen for displaying an image.

The display apparatus may comprise a display panel for displaying an image, and a sound apparatus (or sound output apparatus or a built-in sound a built-in sound device) for outputting sound related to the image. In addition, the display apparatus may output sound to an external sound apparatus (or external sound apparatus) wirelessly connected, such as Bluetooth, NFC, Zigbee, Z-Wave, RFID or Wi-Fi.

The external sound apparatus is wirelessly connected to the display apparatus through pairing after the display apparatus is turned-on and is configured to output sound.

The display apparatus connected to the external sound apparatus may output sound through only one of the sound output apparatus and the external sound apparatus, whereby there is a limitation in providing surround sound or stereophonic sound other than stereo sound to a user.

As the external sound apparatus does not output sound during pairing with the display apparatus, there might be a loss of sound data transmitted from the display apparatus to the external sound apparatus.

The description provided in the discussion of the related art section should not be assumed to be prior art merely because it is mentioned in or associated with that section. The discussion of the related art section may include information that describes one or more aspects of the subject technology, and the description in this section does not limit the invention.

SUMMARY

Accordingly, the present disclosure is directed to providing a display apparatus and a method for driving thereof, and a sound apparatus and a display apparatus including the same that substantially obviates one or more problems due to limitations and disadvantages of the related art.

An aspect of the present disclosure is to provide a display apparatus capable of providing stereo sound and also providing surround sound or stereoscopic sound to a user through an external sound apparatus and a method for driving thereof.

Another aspect of the present disclosure is to provide a display apparatus capable of correcting sound quality and performing a control operation based on sound information collected by a microphone device built into an external sound apparatus and a method for driving thereof.

Another aspect of the present disclosure is to provide a sound apparatus paired with a display apparatus by a wired manner or wireless manner, a display apparatus including the sound apparatus, and a method for driving thereof.

Another aspect of the present disclosure is to provide a sound apparatus capable of providing sound information collected by a microphone device to a display apparatus, a display apparatus including the sound apparatus, and a method for driving thereof.

The objects of the present disclosure are not limited to the aforesaid, but other objects not described herein will be clearly understood by those skilled in the art from descriptions below.

In one embodiment, a display apparatus comprises: a display member including a display panel having a plurality of pixels that are configured to display an image; a sound output apparatus configured to output sound; and an input/output interface configured to connect an external sound apparatus to the display member via a wire, wherein the sound output apparatus and the external sound apparatus are configured to output sound according to a sound mode responsive to the external sound apparatus being connected to the input/output interface via the wire.

In one embodiment, a sound apparatus comprises: a stand portion; a housing connected to the stand portion; a sound output member disposed within the housing, the sound output member including one or more speakers; and a general-purpose input/output port configured to be connected to a display apparatus through a wire, wherein the sound apparatus and the display apparatus are each configured to output sound responsive to the display apparatus being connected to the general-purpose input/output port through the wire.

In one embodiment, a method for driving a display apparatus configured to be connected to an external sound apparatus, the method comprising: determining whether the display apparatus is connected to the external sound apparatus by a wire or is wirelessly connected to the external sound apparatus; setting a sound mode that is based on whether the display apparatus is connected to the external sound apparatus by the wire or is wirelessly connected to the external sound apparatus; and outputting sound through one or more of the external sound apparatus and a sound output apparatus at the display apparatus according to the sound mode.

In one embodiment, a display system comprises: a display apparatus including an internal sound output apparatus configured to output sound and a display panel having a plurality of pixels that are configured to display an image; and an external sound apparatus that is external to the display apparatus and configured to be connected to the display apparatus, the external sound apparatus configured to output sound, wherein at least one of the internal sound output apparatus and the external sound apparatus is configured to output sound according to one of a plurality of different sound modes based on a type of connection used to connect the external sound apparatus to the display apparatus.

In one embodiment, a display apparatus according to an embodiment of the present disclosure may comprise a display member including a display panel having a plurality of pixels configured to display an image, a sound output apparatus configured to output sound; and a communication portion connected to an external sound apparatus, the sound output apparatus and the sound apparatus may be configured to selectively output sound by a sound mode according to a connection situation between the sound apparatus and the communication portion.

In one embodiment, a display apparatus according to an embodiment of the present disclosure may comprise a stand portion, a housing connected to the stand portion, a sound output member disposed at the housing and configured to include one or more speakers, and a communication portion connected to the display apparatus.

Specific details according to various examples of the present specification other than the means for solving the above-mentioned problems are included in the description and drawings below.

The display apparatus according to an embodiment of the present disclosure and the method for driving thereof may provide a user or viewer with surround sound or stereophonic sound as well as stereo sound together with the external sound apparatus.

The display apparatus according to an embodiment of the present disclosure and the method for driving thereof may correct sound quality and perform the control operation based on sound information collected by the microphone device built into the external sound apparatus.

According to the sound apparatus according to an embodiment of the present disclosure, the display apparatus including the same, and the method for driving thereof, the external sound apparatus may be paired with the display apparatus by the wired method as well as the wireless method.

The sound apparatus according to an embodiment of the present disclosure and the display apparatus including the same may provide received sound information to the display apparatus through the microphone device.

Other systems, methods, features and advantages will be, or will become, apparent to one with skill in the art upon examination of the following figures and detailed description. It is intended that all such additional systems, methods, features and advantages be included within this description, be within the scope of the present disclosure, and be protected by the following claims. Nothing in this section should be taken as a limitation on those claims. Further aspects and advantages are discussed below in conjunction with aspects of the disclosure.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure, are incorporated in and constitute a part of this disclosure, illustrate aspects and embodiments of the disclosure and together with the description serve to explain principles of the disclosure.

DETAILED DESCRIPTION

Figure 1:
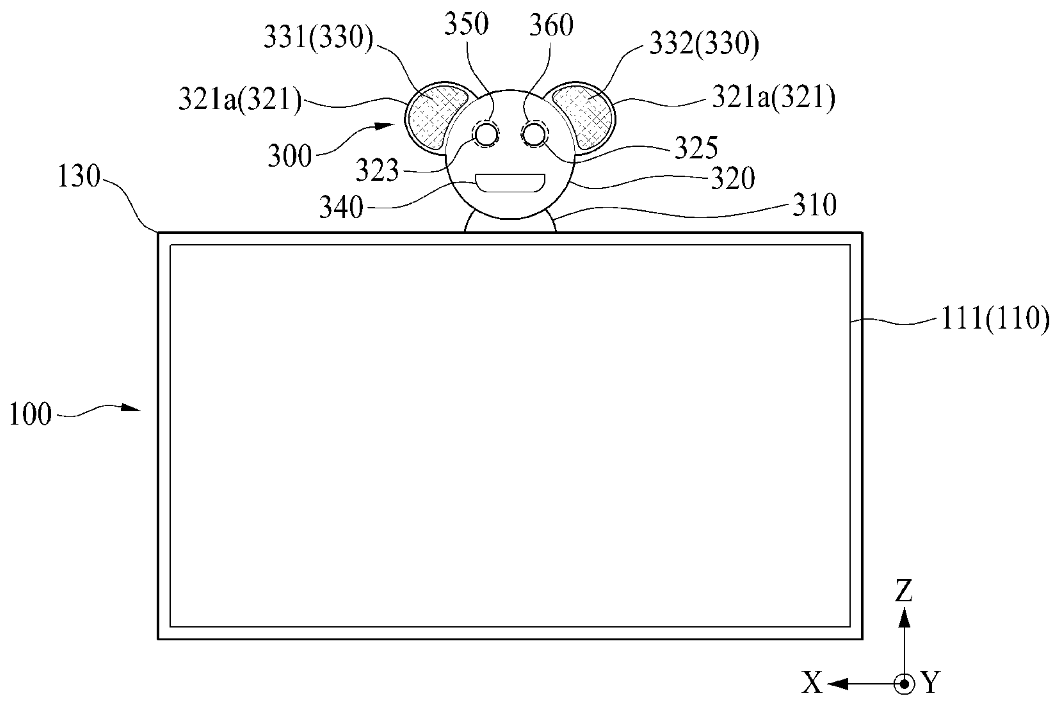
FIG. 1 is a front view illustrating a display apparatus and a sound apparatus according to an embodiment of the present disclosure.

Throughout the drawings and the detailed description, unless otherwise described, the same drawing reference numerals should be understood to refer to the same elements, features, and structures. The relative size and depiction of these elements may be exaggerated for clarity, illustration, and convenience.

Advantages and features of the present disclosure, and implementation methods thereof will be clarified through following embodiments described with reference to the accompanying drawings. The present disclosure can, however, be embodied in different forms and should not be construed as limited to the embodiments set forth herein. Rather, these embodiments are provided so that this disclosure will be thorough and complete, and will fully convey the scope of the present disclosure to those skilled in the art. Furthermore, the present disclosure is only defined by the scopes of the appended claims.

A shape, a size, a ratio, an angle, and a number disclosed in the drawings for describing embodiments of the present disclosure are merely an example, and thus, the present disclosure is not limited to the illustrated details. Like reference numerals refer to like elements throughout. In the following description, when the detailed description of the relevant known technology is determined to unnecessarily obscure the important point of the present disclosure, the detailed description will be omitted. In a case where 'comprise', 'have', and 'include' described in the present disclosure are used, another part can be added unless 'only-' is used. The terms in a singular form may include plural forms unless noted to the contrary.

In construing an element, the element is construed as including an error range although there is no explicit description.

In describing a positional relationship, for example, when a position relation between two parts is described as 'on', 'over', 'under', and 'next', one or more other parts may be disposed between the two parts unless a more limiting term, such as "just" or "direct(ly)" is used.

Spatially relative terms, such as "below," "beneath," "lower," "above," "upper," and the like, may be used to easily describe the relationship of one element or elements and another element or elements as illustrated in the drawings.

Spatially relative terms may be understood as terms including different directions of the device in use or operation, in addition to the direction illustrated in the drawings. For example, when the device in the drawings is turned over, elements described as "below" or "beneath" of other elements may be placed "above" of other elements. Thus, the exemplary term "below" or "beneath" may include both a downward direction and an upward direction.

It will be understood that, although the terms "first", "second", and the like can be used herein to describe various elements, these elements should not be limited by these terms. These terms are only used to distinguish one element from another and may not define any order. For example, a first element could be termed a second element, and, similarly, a second element could be termed a first element, without departing from the scope of the present disclosure.

In describing elements of the present disclosure, the terms "first", "second", "A", "B", "(a)", "(b)", etc. may be used. These terms are intended to identify the corresponding elements from the other elements, and basis, order, or number of the corresponding elements should not be limited by these terms. The expression that an element or a layer is "connected", "coupled" or "adhered" to another element or layer means the element or layer can not only be directly connected or adhered to another element or layer, but also be indirectly connected or adhered to another element or layer with one or more intervening elements or layers "disposed" or "interposed" between the elements or layers, unless otherwise specified.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

In the present disclosure, a "display apparatus" may include a display apparatus such as a narrow-sense display module (or a display member) including a display panel and a driver for driving the display panel, a light emitting display module (for example, an organic light emitting display module, a quantum dot light emitting display module) or a liquid crystal display module (LCM). And, the display module may include a set device (or a set apparatus) or a set electronic device such as a notebook computer, a television, a computer monitor, an equipment apparatus including an apparatus for vehicles, an automotive apparatus, or another type of apparatus for vehicles, or a mobile electronic device such as a smartphone, an electronic pad, or the like, which is a complete product (or a final product) including a display module such as a liquid crystal display module and a light emitting display module (for example, a quantum dot light emitting display module, an organic light emitting display module), or the like.

Therefore, the display apparatus according to an embodiment of the present disclosure may include a display apparatus itself such as a liquid crystal display module, an organic light emitting display module, a quantum dot light emitting display module, a micro light emitting diode display module, or the like, and a set device which is a final consumer device or an application product including the liquid crystal display module, the organic light emitting display module, the quantum dot light emitting display panel, the micro light emitting diode display module, or the like.

The display apparatus according to an embodiment of the present disclosure may be implemented as a user interface apparatus, such as a central control panel or the like in automobiles, and thus, may be applied to vehicles. For example, the display apparatus may be provided between occupants sitting on two front seats in order for a vibration of the display panel to be transferred to the inside of a vehicle. Therefore, an audio experience in a vehicle is improved in comparison with a case where speakers are disposed on interior sides of the vehicle.

Features of various embodiments of the present disclosure can be partially or overall coupled to or combined with each other and can be variously inter-operated with each other and driven technically as those skilled in the art can sufficiently understand. The embodiments of the present disclosure can be carried out independently from each other or can be carried out together in a co-dependent relationship.

Hereinafter, embodiments of the present disclosure will be described in detail with reference to the accompanying drawings. For convenience of description, a scale of each of elements shown in the accompanying drawings differs from a real scale, and thus, is not limited to a scale shown in the drawings.

Figure 2:
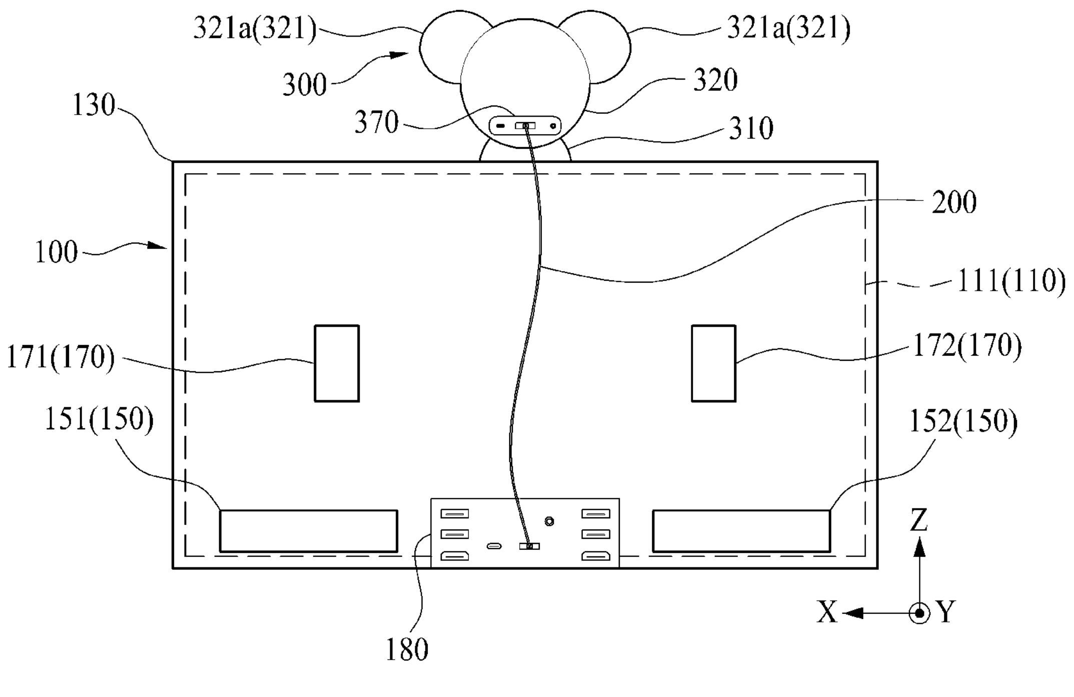
FIG. 2 is a rear view illustrating the display apparatus and the sound apparatus according to an embodiment of the present disclosure.
Figure 3:
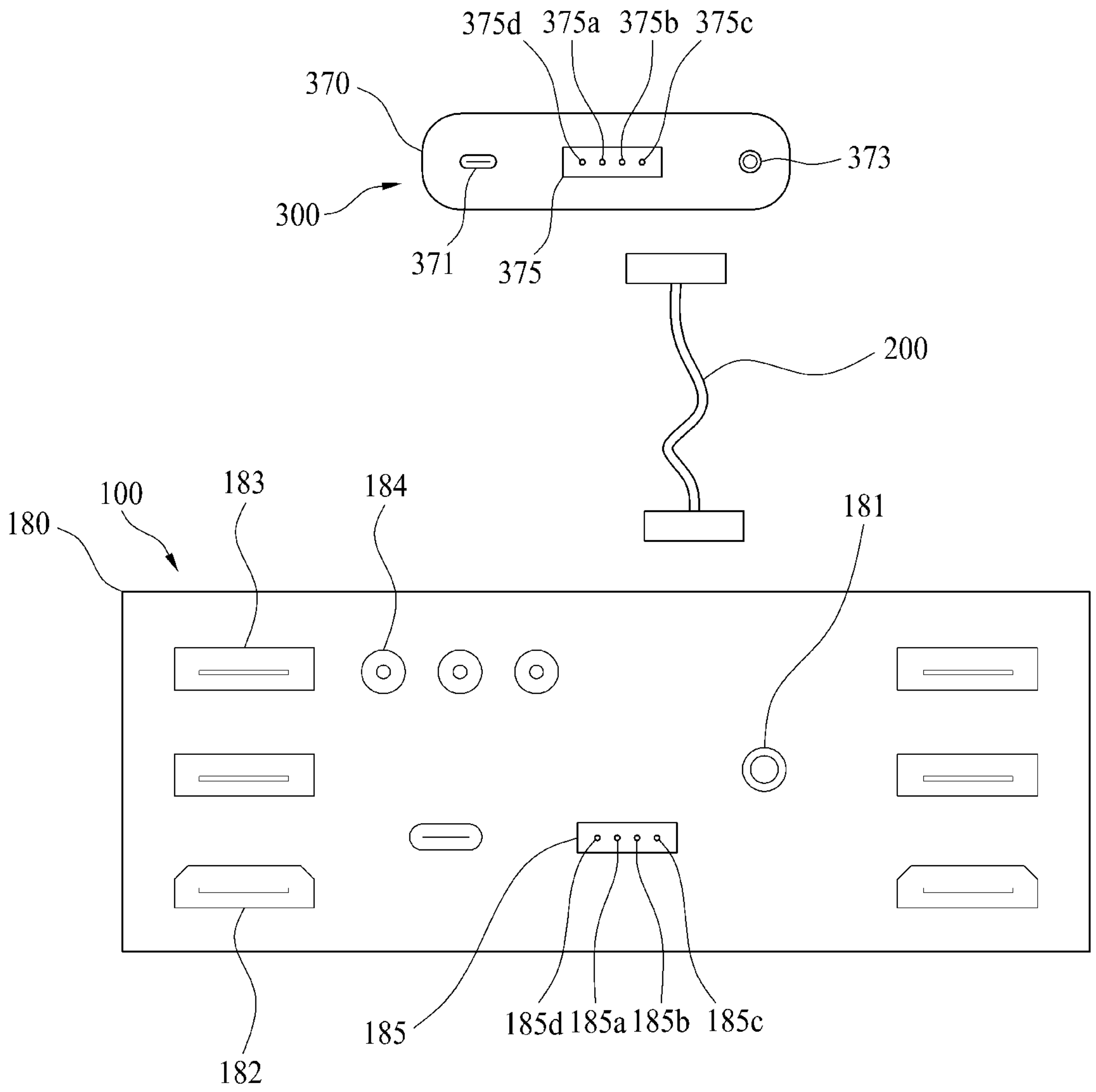
FIG. 3 is a view illustrating an input/output portion of the display apparatus shown in FIG. 2 and a terminal portion of the sound apparatus according to an embodiment of the present disclosure.

FIG. 1 is a front view illustrating a display apparatus and a sound apparatus according to an embodiment of the present disclosure. FIG. 2 is a rear view illustrating the display apparatus and the sound apparatus according to an embodiment of the present disclosure. FIG. 3 is a view illustrating an input/output portion of the display apparatus shown in FIG. 2 and a terminal portion of the sound apparatus according to an embodiment of the present disclosure.

Referring to FIGS. 1 and 2, the display apparatus 100 (or display system) according to an embodiment of the present disclosure may at least include a display member 110, a rear cover 130, a sound output apparatus 150, and a sound apparatus 300.

The display member 110 may include a display panel 111 that is configured to display an image by outputting light. The display panel 111 comprises a plurality of pixels and configured to display an image and a panel driving circuit part configured to drive the display panel 111.

The display panel 111 may be a curved display panel or one of all types of display panels such as a liquid crystal display panel, an organic light emitting display panel, a quantum dot light emitting display panel, a micro light emitting diode display panel, and an electrophoretic display panel, Plasma Display Panel (PDP) or the like. The display panel 111 may be a curved display panel. The display panel 111 may be a flexible display panel. For example, the display panel 111 may also be a flexible light emitting display panel, a flexible electrophoretic display panel, a flexible electrowetting display panel, a flexible micro light emitting diode display panel, or a flexible quantum dot light emitting display panel or the like, but embodiments of the present disclosure are not limited thereto.

When the display panel 111 is a liquid crystal display panel, the display member 110 may further include a backlight for irradiating light to the rear surface of the liquid crystal display panel.

The rear cover 130 may be disposed or configured at rear surface of the display member 110. The rear cover 130 may be configured to support or surround the rear surface of the display member 110. The rear cover 130 may be configured to surround lateral surfaces of the display member 110. The rear cover 130 may be spaced apart from the rear surface of the display member 110. For example, the rear surface of the rear cover 130 may face the rear surface of the display member 110 with a gap space therebetween.

The sound output apparatus 150 may be disposed or configured on the rear surface of the rear cover 130. The sound output apparatus 150 may be an internal sound output apparatus of the display panel 111, an internal sound module of the display panel 111, an embedded speaker of the display panel 111, or an internal speaker of the display panel 111, but embodiments of the present disclosure are not limited thereto.

The sound output apparatus 150 may vibrate according to sound data and output sound which corresponds to the sound data. For example, the sound output apparatus 150 may be configured to output sound in a downward direction of the rear cover 130 with respect to a vertical direction Z perpendicular to the ground, but embodiments of the present disclosure are not limited thereto, and the sound output apparatus 150 may be configured to output sound in other directions such as an upward direction.

The sound output apparatus 150 may be configured to output a realistic sound and/or stereo sound in a multichannel, for example, including left-sided sound and right-sided sound. For example, the sound output apparatus 150 may include two or more channels.

The sound output apparatus 150 according to an embodiment of the present disclosure may comprise one or more first sound output apparatuses 151 and one or more second sound output apparatuses 152. Alternatively, the sound output apparatus 150 may comprise one or more first sound output apparatuses to one or more nth sound output apparatuses.

The one or more first sound output apparatuses 151 may be disposed at a first rear area of the rear surface of the rear cover 130. The one or more first sound output apparatuses 151 may be disposed at the left rear surface of the rear cover 130, for example. The one or more first sound output apparatuses 151 may be left sound output apparatuses. Alternatively, the one or more first sound output apparatuses 151 may be disposed at the right rear surface of the rear cover 130 and may be right sound output apparatuses.

The one or more second sound output apparatuses 152 may be disposed at a second rear area of the rear surface of the rear cover 130. The one or more second sound output apparatuses 152 may be disposed at the right rear surface of the rear cover 130, for example. The one or more second sound output apparatuses 152 may be right sound output apparatuses. Alternatively, the one or more second sound output apparatuses 152 may be disposed at the left rear surface of the rear cover 130 and may be left sound output apparatuses.

According to an embodiment of the present disclosure, each of the one or more first sound output apparatuses 151 and the one or more second sound output apparatuses 152 may be configured in a sound actuator, a piezoelectric element or a sound exciter as a speaker which includes a coil (or voice coil) or a piezoelectric ceramic and a magnet. For example, one or more of the one or more first sound output apparatuses 151 and the one or more second sound output apparatuses 152 may be sound output apparatuses including a woofer, a mid-woofer, a sub-woofer or woofer-integrated sound output apparatuses. For example, each of the one or more first sound output apparatuses 151 and the one or more second sound output apparatuses 152 may be coil-type sound output apparatuses or voice coil-type sound output apparatuses or piezoelectric-type sound output apparatuses.

The display apparatus 100 according to an embodiment of the present disclosure may further include a vibration apparatus 170.

The vibration apparatus 170 may be configured to vibrate the display member 110 or the rear cover 130. The vibration apparatus 170 may be configured to vibrate the display member 110 or the rear cover 130 and to output the sound generated based on the vibration of the display member 110 or the rear cover 130 in the front direction of the display member 110. Therefore, the display apparatus 100 according to an embodiment of the present disclosure may output the sound generated according to the vibration of the display member 110 in the front direction of the display member 110, thereby improving an immersion for a viewer watching the image of the display apparatus 100.

According to an embodiment of the present disclosure, the vibration apparatus 170 may be configured to vibrate the rear cover 130. The vibration apparatus 170 vibrates the rear cover 130 and outputs the sound generated according to the vibration of the display member 110 by the vibration of the rear cover 130 in the front direction of the display member 110. For example, the display member 110 may vibrate by the sound (or sound waves) transmitted or propagated according to the vibration of the rear cover 130 by the driving (or vibration) of the vibration apparatus 170, and the sound generated by the vibration of the display member 110 may be output in the front direction of the display member 110. Accordingly, the rear cover 130 may be used as a vibration plate (or a diaphragm or a vibration member or a vibration object) or a sound vibration plate (or an acoustic diaphragm) for outputting the sound in the front direction of screen according to the vibration (or driving) of the vibration apparatus 170.

According to another embodiment of the present disclosure, the vibration apparatus 170 may be configured to vibrate the display member 110. The vibration apparatus 170 may be connected to the rear surface of the display member 110. The vibration apparatus 170 may vibrate the display member 110 and may output the sound generated according to the vibration of the display member 110 in the front direction of the display member 110. For example, the vibration apparatus 170 may be configured to vibrate the display panel 111 of the display member 110. The vibration apparatus 170 may be connected to the rear surface of the display panel 111. The vibration apparatus 170 may vibrate the display panel 111 and may output the sound generated according to the vibration of the display panel 111 in the front direction of the display panel 111. Accordingly, the display member 110 or the display panel 111 may be used as a vibration plate (or a diaphragm or a vibration member or a vibration object) or a sound vibration plate (or an acoustic diaphragm) for outputting the sound in the front direction of screen according to the vibration (or driving) of the vibration apparatus 170.

The vibration apparatus 170 according to an embodiment of the present disclosure may include one or more first vibration apparatuses 171 and one or more second vibration apparatuses 172. Alternatively, the vibration apparatus 170 may comprise one or more first sound output apparatuses to one or more nth sound output apparatuses.

The one or more first vibration apparatuses 171 may be disposed at the first area of the rear surface of the rear cover 130 (or display member 110). For example, the one or more first vibration apparatuses 171 may be disposed at a left rear surface of the rear cover 130 (or display member 110). The one or more first vibration apparatuses 171 may be disposed at a middle area on the left rear surface of the rear cover 130 (or display member 110). The one or more first vibration apparatuses 171 may be a left vibration apparatus. For example, the one or more first vibration apparatuses 171 may be disposed or configured around one or more first sound output apparatuses 151. Alternatively, the one or more first vibration apparatuses 171 may be disposed at a middle area on the right rear surface of the rear cover 130 (or display member 110) and may be a right vibration apparatus. For example, the one or more first vibration apparatuses 171 may be disposed or configured around one or more second sound output apparatuses 152.

The one or more second vibration apparatuses 172 may be disposed at the second area of the rear surface of the rear cover 130 (or display member 110). For example, the one or more second vibration apparatuses 172 may be disposed at a right rear surface of the rear cover 130 (or display member 110). The one or more second vibration apparatuses 172 may be disposed at a middle area in the right rear surface of the rear cover 130 (or display member 110). The one or more second vibration apparatuses 172 may be a right vibration apparatus. For example, the one or more second vibration apparatuses 172 may be disposed or configured around one or more second sound output apparatuses 152. Alternatively, the one or more second vibration apparatuses 172 may be disposed at a middle area on the left rear surface of the rear cover 130 (or display member 110) and may be a left vibration apparatus. For example, the one or more second vibration apparatuses 172 may be disposed or configured around one or more first sound output apparatuses 151.

Each of the one or more first vibration apparatuses 171 and the one or more second vibration apparatuses 172 according to an embodiment of the present disclosure may include a sound actuator or a sound exciter which includes a coil (or voice coil) and a magnet. For example, the one or more of the one or more first vibration apparatuses 171 and the one or more second vibration apparatuses 172 may be a sound output apparatus including a woofer, a mid-woofer, a sub-woofer or a woofer-integrated sound output apparatus. For example, each of the one or more first vibration apparatuses 171 and the one or more second vibration apparatuses 172 may be a coil-type sound output apparatus or a voice coil-type sound output apparatus.

Each of the one or more first vibration apparatuses 171 and the one or more second vibration apparatuses 172 according to another embodiment of the present disclosure may be a piezoelectric vibration apparatus including a piezoelectric material or a piezoelectric composite. For example, each of the one or more first vibration apparatuses 171 and the one or more second vibration apparatuses 172 may be a piezoelectric device (or an piezoelectric element or a piezoelectric material), a piezoelectric film, a piezoelectric film speaker, a flexible piezoelectric speaker, a film type piezoelectric composite actuator, a film type piezoelectric speaker, a piezoelectric speaker, a film type piezoelectric composite speaker, or the like, but embodiments of the present disclosure are not limited thereto.

Referring to FIGS. 2 and 3, the display apparatus 100 according to an embodiment of the present disclosure may further comprise an input/output portion 180 (e.g., input/output circuit). In one embodiment, the input/output portion 180 is an input/output interface to connect the display apparatus 100 to the external sound apparatus 300.

The input/output portion 180 may be configured to transmit and receive power, a video signal, an audio signal, and additional information/data from the outside of the display apparatus 100. The input/output portion 180 may include a power port 181, at least one high-definition multimedia interface HDMI port 182, a component port 183, and a general-purpose serial bus USB port 184. Other ports not shown in the Figure may be included in the input/output portion 180, and at least one port as mentioned above may be omitted, with its function incorporated into another port. For example, the input/output portion 180 may be a first input/output portion, a display input/output portion, or a display terminal portion.

The display apparatus 100 or the input/output portion 180 according to an embodiment of the present disclosure may further include a general-purpose input/output GPIO port 185.

The GPIO port 185 may be connected to an external device through a signal cable (or GPIO cable) 200. Thus, the display apparatus 100 may perform a bidirectional communication with an external device through the GPIO port 185 and the signal cable 200. For example, the GPIO port 185 may be connected to the external sound apparatus 300 through the signal cable 200. For example, the GPIO port 185 may be a first general-purpose input/output port, a display input/output port, an external speaker connection port, or an external speaker connection port.

The GPIO port 185 according to an embodiment of the present disclosure may include a first signal transmission/reception pin 185*a*, a second signal transmission/reception pin 185*b*, a power output pin 185*c*, and a ground pin 185*d*, but embodiments of the present disclosure are not limited thereto.

Referring to FIGS. 1 and 2, the sound apparatus 300 according to an embodiment of the present disclosure may be disposed at the periphery of the display apparatus 100. For example, the sound apparatus 300 may be disposed at an upper surface of the display apparatus 100. Alternatively, the sound apparatus 300 may be disposed at another surface (e.g., a left, right or lower surface) of the display apparatus 100. The sound apparatus 300 may be configured to output the sound corresponding to the sound data transmitted from the display apparatus 100. For example, the sound apparatus 300 may be an audio apparatus, an audio output apparatus, an external sound apparatus, an external sound apparatus, a sound bar, a Bluetooth sound bar, a Bluetooth sound apparatus, a Bluetooth speaker, a sound system, a sound apparatus for vehicular apparatuses, a sound output apparatus for vehicular apparatuses, or a sound bar for vehicular apparatuses, or the like.

The sound apparatus 300 may be connected to or paired with the display apparatus 100 in a wireless method such as via Wi-Fi or Bluetooth or a wired method e.g. using a signal cable 200. The sound apparatus 300 may output the sound corresponding to the sound data transmitted from the display apparatus 100 connected or paired. For example, the sound apparatus 300 may output the sound corresponding to the sound data transmitted in a wireless manner from the display apparatus 100 connected or paired. For example, the sound apparatus 300 may output the sound corresponding to the sound data transmitted through Bluetooth or an advanced audio distribution profile A2DP protocol of Bluetooth from the display apparatus 100 connected through Bluetooth. Alternatively, the sound apparatus 300 may output the sound corresponding to the sound data transmitted through Wi-Fi from the display apparatus 100 connected through Wi-Fi.

According to an embodiment of the present disclosure, the sound apparatus 300 may output the sound instead of the sound output apparatus 150 of the display apparatus 100. In this case, the sound apparatus 300 may output stereo sound.

According to another embodiment of the present disclosure, the sound apparatus 300 may output sound together with the sound output apparatus 150 of the display apparatus 100. In this case, the sound apparatus 300 may output surround sound or stereophonic sound together with the sound output apparatus 150 of the display apparatus 100. For example, the display apparatus 100 outputs the sound through the sound apparatus 300 together with the sound output apparatus 150, thereby providing the surround sound, sounds of two or more channels, or stereophonic sound as well as the stereo sound to a user.

The sound apparatus 300 according to another embodiment of the present disclosure may include a stand portion 310, a housing 320, and a sound output member 330. For example, the sound apparatus 300 may include a polygonal shape, an oval shape, a circular shape, or a combined shape of a curved surface so as to improve design aesthetic. For example, the sound apparatus 300 may be configured to realize an animal's (such as a mouse's or a bear's) head shape by a combination of shapes of the housing 320 and the sound output member 330, but embodiments of the present disclosure are not limited thereto.

The stand portion 310 may be disposed at an upper part of the display apparatus 100, but embodiments of the present disclosure are not limited thereto. For example, the stand portion 310 may be disposed at a support such as the ground, desk, shelf, or the like.

The housing 320 may be connected to the stand portion 310. For example, the housing 320 may be rotatably connected to the stand portion 310. The housing 320 may be connected to the stand portion 310 through a rotary shaft, a pivot or the like. For example, the housing 320 may be rotated in a diagonal direction and up, down, left, and right directions in the stand portion 310 by a physical rotation applied by a user. For example, the housing 320 may be rotated in the up, down, left, and right directions from the stand portion 310 by rotation of a motor according to a manual or an automatic button method or a short-range remote control.

The sound output member 330 may be disposed or configured at the housing 320. The sound output member 330 may be disposed or configured at a protruding portion 321 that protrudes from the housing 320.

The sound output member 330 may be configured to output the sound corresponding to the sound data provided from the display apparatus 100 or the stereo sound including left sound and right sound. The sound output member 330 may be configured to output the surround sound, sounds of two or more channels, or stereophonic sound together with the sound output apparatus 150 of the display apparatus 100.

The sound output member 330 may include one or more channels. For example, the sound output member 330 may include one or more speakers 331 and 332.

The sound apparatus 300 or the sound output member 330 according to an embodiment of the present disclosure may include one or more first speakers 331 and one or more second speakers 332.

The one or more first speakers 331 may be disposed or embedded at one side of the housing 320. For example, the one or more first speakers 331 may be disposed or embedded in a first protruding portion **321*a* of the protruding portion 321 protruding from the housing 320. The first protruding portion 321*a* of the housing 320 may protrude from one side of the housing 320 in a first direction (e.g., left direction) and may include an opening exposing the front surface of the one or more first speakers 331**.

The one or more first speakers 331 may be configured to output the sound corresponding to the sound data transmitted from the display apparatus 100. For example, the one or more first speakers 331 may be configured to output left sound corresponding to left sound data transmitted from the display apparatus 100. For example, the one or more first speakers 331 may be a left speaker. Alternatively, the one or more first speakers 331 may be configured to output right sound corresponding to right sound data transmitted from the display apparatus 100 and may be a right speaker.

The one or more second speakers 332 may be disposed or embedded in the other side of the housing 320, which is opposite to one side of the housing 320. For example, the one or more second speakers 332 may be disposed or embedded in a second protruding portion **321*b* of the protruding portion 321 protruding from the housing 320 in a second direction that is different from the first direction (e.g., a right direction). The second protruding portion 321*b* of the housing 320 may protrude from the other side of the housing 320, wherein the other side is opposite to the one side of the housing 320, and the second protruding portion 321*b* of the housing 320 may include an opening for exposing the front surface of the one or more second speakers 332. For example, the first protruding portion 321*a* and the second protruding portion 321*b* of the housing 320 may have a symmetrical structure (for example, an upper and lower symmetric structure, or a left and right symmetric structure) with respect to the center of the housing 320, but embodiments of the present disclosure are not limited thereto. For example, the first protruding portion 321*a* and the second protruding portion 321*b* of the housing 320** may be configured to realize an animal's (e.g., a mouse's or a bear's) ear shape, but embodiments of the present disclosure are not limited thereto.

The one or more second speakers 332 may be configured to output the sound corresponding to the sound data transmitted from the display apparatus 100. For example, the one or more second speakers 332 may be configured to output right sound corresponding to right sound data transmitted from the display apparatus 100. For example, the one or more second speakers 332 may be a right speaker. Alternatively, the one or more second speakers 332 may be configured to output left sound corresponding to left sound data transmitted from the display apparatus 100 and may be a left speaker.

Each of the one or more first speakers 331 and the one or more second speakers 332 according to an embodiment of the present disclosure may be configured in a sound actuator or a sound exciter which includes a coil (or voice coil) or a piezoelectric ceramic and a magnet. For example, one or more of the one or more first speakers 331 and the one or more second speakers 332 may be sound output apparatuses including a woofer, a mid-woofer, a sub-woofer or woofer-integrated sound output apparatuses. For example, each of the one or more first speakers 331 and the one or more second speakers 332 may be coil-type sound output apparatuses or voice coil-type sound output apparatuses or piezoelectric-type sound output apparatuses.

The one or more first speakers 331 and the one or more second speakers 332 may output sound in a direction in addition to the front direction of the display apparatus 100 by the rotation of the housing 320. For example, the one or more first speakers 331 and the one or more second speakers 332 may also output sound in any one direction of an upper direction, a lateral direction, a front diagonal direction among the front direction, the lateral direction, and the upper direction, a rear direction, and a rear diagonal direction among the rear direction, the lateral direction, and the upper direction, by the rotation of the housing 320.

The sound apparatus 300 according to an embodiment of the present disclosure may further include a display part 340.

The display part 340 may be disposed or configured at the front surface of the housing 320. The display part 340 may be disposed or configured at a lower area on the front surface of the housing 320. Alternatively, the display part 340 may be disposed or configured at another (e.g., middle) area on the front surface of the housing 320. The display part 340 may be configured to display information related to the operation of the sound apparatus 300. For example, the display part 340 may include a liquid crystal display module, a (e.g., organic or inorganic) light emitting diode module, a quantum-dot light emitting display module, a light emitting diode display module, or a light emitting display module. For example, the display part 340 may be configured to realize an animal's (e.g., a mouse's or a bear's) mouth shape or another facial organ, but embodiments of the present disclosure are not limited thereto.

The sound apparatus 300 according to an embodiment of the present disclosure may further include a microphone device 350.

The microphone device 350 may be configured to receive (or collect) sound (or audio sound) around the sound apparatus 300 or display apparatus 100. The microphone device 350 may be disposed or embedded (or built) in the housing 320. The housing 320 may include a microphone hole 323 for exposing at least a portion of the microphone device 350 to the outside.

According to an embodiment of the present disclosure, the microphone device 350 may receive (or collect) sound (or audio sound) information about the sound apparatus 300 or the surrounding environment of the display apparatus 100 and may provide the received sound information (or collected information) to the display apparatus 100. For example, the microphone device 350 may receive connection sound (or pairing effect sound) generated when display apparatus 100 and the sound apparatus 300 are connected (or paired) to each other, may provide connection sound characteristic information to the display apparatus 100. For example, the microphone device 350 may receive the surrounding sound including the sound of the surrounding environment and the sound output from at least one of the display apparatus 100 and the sound apparatus 300, and may provide the surrounding sound information to the display apparatus 100. For example, the microphone device 350 may receive voice (or sound) of a user (or viewer) and may provide voice recognition information to the display apparatus 100. For example, the microphone device 350 may be configured to perform a Voice over Internet Protocol VoIP (including H.323, SIP, MEGACO and MGCP), and may display voice internet protocol information on the display part 340.

The sound apparatus 300 according to an embodiment of the present disclosure may further include a camera device 360.

The camera device 360 may be configured to photograph (or image) an image in the periphery of the sound apparatus 300 or display apparatus 100. The camera device 360 may be disposed or embedded (or built) in the housing 320. For example, the camera device 360 may be disposed or embedded (or built) in the housing 320 while being parallel to the microphone device 350. The housing 320 may include a camera hole 325 for exposing a lens portion of the camera device 360 to the outside. For example, an area including the microphone hole 323 in the housing 320 and an area including the camera hole 325 may be configured to realize an animal's eye shape or other body parts, but embodiments of the present disclosure are not limited thereto. For example, the housing 320, the first protruding portion 321*a*, the second protruding portion 321*b*, the microphone hole 323, and the camera hole 325 may be configured to realize an animal's (e.g., a mouse's or a bear's) head shape, but embodiments of the present disclosure are not limited thereto.

The camera device 360 may be configured to photograph the image in the periphery of the sound apparatus 300 or display apparatus 100 according to, for example, the Voice over Internet Protocol and to transmit photographed image information to the display apparatus 100 or a user's terminal device in real time. For example, the camera device 360 may be configured to photograph the image in the periphery of the sound apparatus 300 or display apparatus 100 according to, for example, a closed-circuit television function and to transmit photographed image information to the display apparatus 100 or a user's terminal device in real time.

Referring to FIGS. 2 and 3, the sound apparatus 300 according to an embodiment of the present disclosure may further include a terminal portion 370. The terminal portion 370 may include a USB charging port 371, an AUX port 373, and the like. The terminal portion 370 may be configured to be connected (or paired) with the input/output portion 180 of the display apparatus 100 by wire or wirelessly.

The sound apparatus 300 or the terminal portion 370 according to an embodiment of the present disclosure may further include a general-purpose input/output port 375.

The general-purpose input/output port 375 may be configured to be connected (or paired) with the display apparatus 100 by wire or wirelessly. The general-purpose input/output port 375 may be configured to be connected (or paired) with the display apparatus 100 via the signal cable 200 or over the air. Accordingly, the sound apparatus 300 may perform a bidirectional communication with an external master device (or host device) through the general-purpose input/output port 375 and the signal cable 200 in a wired manner. For example, the general-purpose input/output port 375 may be connected to the display apparatus 100 via the signal cable 200. For example, the general-purpose input/output port 375 may be connected to the general-purpose input/output port 185 of the display apparatus 100 via the signal cable 200. For example, the general-purpose input/output port 375 of the sound apparatus 300 may be a second general-purpose input/output port, a speaker input/output port, an external device connection port, a display connection port or the like.

The general-purpose input/output port 375 of the sound apparatus 300 according to an embodiment of the present disclosure may include a first signal transmission/reception pin 375*a*, a second signal transmission/reception pin 375*b*, a power input pin 375*c*, and a ground pin 375*d* and the like, but embodiments of the present disclosure are not limited thereto.

According to an embodiment of the present disclosure, the first signal transmission/reception pin 375*a*, the second signal transmission/reception pin 375*b*, the power input pin 375*c*, and the ground pin 375*d* may be respectively connected to the first signal transmission/reception pin 185*a*, the second signal transmission/reception pin 185*b*, the power output pin 185*c*, and the ground pin 185*d* provided at the general-purpose input/output port 185 of the external device or the display apparatus 100 through the signal cable 200 by a one-to-one correspondence or individually.

The general-purpose input/output port 375 of the sound apparatus 300 may be used to transmit an authentication signal of the display apparatus 100 to the sound apparatus 300 and receive an identification signal (or authentication signal) from the sound apparatus 300 for the connection (or pairing) of the display apparatus 100 and the sound apparatus 300, but embodiments of the present disclosure are not limited thereto. For example, the general-purpose input/output port 375 of the sound apparatus 300 may be used to receive the sound data from the connected (or paired) external device or display apparatus 100. For example, the general-purpose input/output port 375 of the sound apparatus 300 may be used to transmit the received sound information (or voice recognition information) from the microphone device 350 illustrated in FIG. 1 to the external device or display apparatus 100 connected (or paired). For example, the general-purpose input/output port 375 of the sound apparatus 300 may be used to transmit video information photographed by the camera device 360 illustrated in FIG. 1 to the external device or display apparatus 100 connected (or paired).

Figure 4:
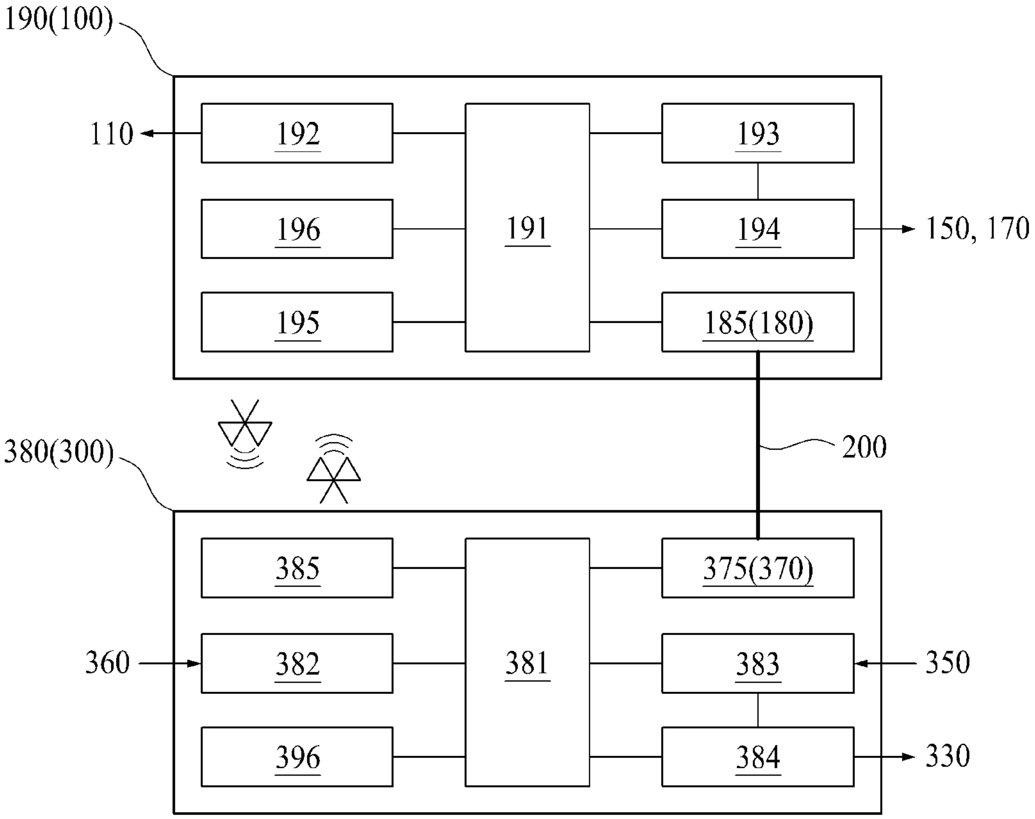
FIG. 4 shows a circuit configuration of each of the display apparatus and the sound apparatus according to an embodiment of the present disclosure.

FIG. 4 shows a circuit configuration of each of the display apparatus 100 and the sound apparatus 300 according to an embodiment of the present disclosure.

Referring to FIGS. 1, 2, and 4, the display apparatus 100 according to an embodiment of the present disclosure may further include a display driving circuit part 190.

The display driving circuit part 190 may include various circuits necessary for driving the display apparatus 100. The display driving circuit portion 190 may be configured to be connected (or paired) with the external device or external sound apparatus 300. For example, the display driving circuit portion 190 may include the general-purpose input/output port 185 and a wireless communication portion 195.

The display driving circuit part 190 according to an embodiment of the present disclosure may at least include a host control portion 191, an image processing portion 192, a sound processing portion 193, a sound signal output portion 194, a wireless communication portion 195, and a storing portion 196.

The host control portion 191 (e.g., a circuit) controls an overall operation of the display apparatus 100 and a signal flow between the internal components of the display apparatus 100 and performs a data-processing function.

The image processing portion (or display-side image processing circuit) 192 or the host control portion 191 may generate image data and provide the image data to the display member 110. Accordingly, the display member 110 may display an image corresponding to the image data from the image processing portion 192 on the display panel. For example, the image processing portion 192 may be embedded (or built) in the host control portion 191 or may be integrated into the host control portion 191.

The sound processing portion (or display-side sound processing circuit) 193 or the host control portion 191 generates sound data from sound source provided through the wireless communication portion 195 or the input/output portion 180 and provides the sound data to the sound signal output portion 194 and/or the wireless communication portion 195. For example, the sound processing portion 193 may select one or more formats required to reproduce the sound source from audio format stored in the storing portion 196 and may perform encoding or decoding of the sound source using a codec corresponding to the selected format, to thereby generate the sound data. The sound processing portion 193 may generate the sound data corresponding to the number of channels of the sound generating apparatus 150 or the number of channels according to a combination of the sound generating apparatus 150 and the vibration apparatus 170. For example, when the display apparatus 100 is connected (or paired) with the external sound apparatus 300, the sound processing portion 193 may generate the sound data corresponding to the number of channels according to one or more of the sound generating apparatus 150 and the vibration apparatus 170. For example, the sound processing portion 193 may be embedded (or built) in the host control portion 191 or may be integrated into the host control portion 191.

The sound signal output portion (or display-side sound signal output circuit) 194 or the host control portion 191 may supply the sound signal (or voice signal) corresponding to the sound data provided from the sound processing portion 193 to one or more of the sound generating apparatus 150 and the vibration apparatus 170. For example, the sound signal output portion 194 may include one or more digital-to-analog converting circuits for converting the sound data provided from the sound processing portion 193 into analog data signals, and one or more amplifier circuits for amplifying the analog data signals into the sound signals and supplying the sound signals to one or more of the sound generating apparatus 150 and the vibration apparatus 170.

The wireless communication portion (or display-side wireless communication circuit) 195 may be wirelessly connected (or paired) to the sound apparatus 300 under the control of the host control portion 191. The wireless communication portion 195 wirelessly transmits the sound data provided from the sound processing portion 193 to the sound apparatus 300 wirelessly connected (or paired) under the control of the host control portion 191. For example, the wireless communication portion 195 may include a Bluetooth communication circuit. Wi-Fi communication circuit, Infrared communication circuit, mobile communication or the like. For example, the display apparatus 100 may perform Bluetooth communication with the sound apparatus 300 through the wireless communication portion 195. The wireless communication portion 195 may wirelessly transmit the sound data to the sound apparatus 300 through Bluetooth communication under the control of the host control portion 191. Alternatively, the display apparatus 100 may perform Wi-Fi communication with the sound apparatus 300 through the wireless communication portion 195. The wireless communication portion 195 may transmit the sound data to the sound apparatus 300 through Wi-Fi communication under the control of the host control portion 191.

The wireless communication portion 195 according to an embodiment of the present disclosure may transmit the sound data provided from the sound processing portion 193 to the sound apparatus 300 through A2DP protocol, but embodiments of the present disclosure are not limited thereto. For example, the wireless communication portion 195 according to an embodiment of the present disclosure may transmit the sound data provided from the sound processing portion 193 to the sound apparatus 300 through AVRCP protocol.

The storing portion (or display-side storing portion) 196 may include an operating system for driving the display apparatus 100, various software executed according to the operating system, programs, applications, and additional data. The storing portion 196 may store various data and/or control programs for driving and controlling the sound apparatus 300 connected (or paired) under the control of the host control portion 191. The storing portion 196 may store input/output signals or data corresponding to driving of each of the wireless communication portion 195, the input/output portion 180, the display panel 111, the sound output apparatus 150, and the vibration apparatus 170. For example, the storing portion 196 may include Blue disk (BD), universal serial bus (USB), a non-volatile memory (e.g., ROM), a volatile memory (e.g., RAM, SDARM), PROM, EPROM, EEPROM, CD-ROM, flexible disk, soft disk, tape, flash memory, a hard disk drive HDD, or a solid-state drive SSD.

The storing portion 196 may store a profile corresponding to transmission of the sound data with respect to the sound output apparatus 150 of the display apparatus 100 and the vibration apparatus 170. The storing portion 196 may store a packet corresponding to the connection (or pairing) between the display apparatus 100 and the sound apparatus 300.

The storing portion 196 may store identification information (or authentication information) for the sound apparatus 300 connected (or paired), the sound output characteristics, reference connection sound characteristic information, optimal sound output characteristics, and other required information.

The sound apparatus 300 according to an embodiment of the present disclosure may further include a speaker driving circuit part 380.

The speaker driving circuit part 380 may include various circuits necessary for driving the sound apparatus 300. The speaker driving circuit part 380 according to an embodiment of the present disclosure may comprise a speaker control portion 381, an image processing portion 382, a sound processing portion 383, a sound signal output portion 384, a wireless communication portion 385, and a storing portion 386.

The speaker control portion 381 (e.g., a circuit) may be configured to be connected to various circuits constituting the sound apparatus 300. For example, the speaker control portion 381 may be configured to be connected to the image processing portion 382, the sound processing portion 383, the sound signal output portion 384, the wireless communication portion 385, the storing portion 386, and the terminal portion 370 with general-purpose input/output port 375. The speaker control portion 381 may control an overall operation of the sound apparatus 300 and a signal flow between the internal components of the sound apparatus 300, and may perform a data-processing function.

The image processing portion (or speaker-side image processing circuit) 382 or the speaker control portion 381 may generate camera image data by decoding photographed image or video information provided from the camera device 360 to correspond to a preset image format and scaling the photographed image or video information according to an interface protocol such as CVBS, VGA, DVI, HDMI, SDI, Camera Link, HS-LINK, and CoaXPress. For example, the image processing portion 382 may be embedded (or built) in the speaker control portion 381 or integrated into the speaker control portion 381.

The sound processing portion (or speaker-side sound processing circuit) 383 or the speaker control portion 381 may receive the sound data signal input from the display apparatus 100 through the wireless communication portion 385 or the terminal portion 370, and store the received sound data signal in the storing portion 396. The sound processing portion 383 or the speaker control portion 381 may generate (or restore) sound data by decoding the sound data signal stored in the storing portion 396. For example, the sound processing portion 383 may decode an acoustic data signal stored in the storing portion 396 according to an A2DP protocol or another protocol to generate (or restore) sound data. For example, the sound processing portion 383 may be embedded (or built) in the speaker control portion 381 or integrated into the speaker control portion 381.

According to an embodiment of the present disclosure, a sound processing portion 383 or a speaker control portion 381 can select one or more formats required for playing sound information (or collection information) in an audio format stored in a storing portion 386, and perform encoding of sound information (or collection information) by using a codec corresponding to the selected format, thereby generating microphone sound data.

According to an embodiment of the present disclosure, the sound signal output portion 384 or the speaker control portion 381 may supply the sound signal (or voice signal) corresponding to the sound data provided from the sound processing portion 383 to the sound output member 330. For example, the sound signal output portion 384 may include one or more digital-to-analog converting circuits for converting sound data provided from the sound processing portion 383 into analog data signals, and one or more amplifier circuits for amplifying the analog data signals into sound signals and supplying the sound signals to the sound output member 330.

The wireless communication portion (or speaker-side wireless communication circuit) 385 may be wirelessly connected (or paired) to the display apparatus 100 under the control of the speaker control portion 381. The wireless communication portion 385 may be wirelessly connected (or paired) with the wireless communication portion 195 of the display apparatus 100 under the control of the speaker control portion 381. The wireless communication portion 385 may receive sound data wirelessly transmitted from the display apparatus 100 under the control of the speaker control portion 381 and may provide the sound data to the sound processing portion 383 or the speaker control portion 381. For example, the wireless communication portion 385 may include a Bluetooth communication circuit. Accordingly, the sound apparatus 300 may perform Bluetooth communication with the display apparatus 100 through the wireless communication portion 385. Alternatively, the wireless communication portion 385 may include a Wi-Fi communication circuit. Accordingly, the sound apparatus 300 may perform Wi-Fi communication with the display apparatus 100 through the wireless communication portion 385.

According to an embodiment of the present disclosure, the wireless communication portion 385 may transmit camera image or video data provided from the image processing portion 382 to the wireless communication portion 195 of the display apparatus 100 under the control of the speaker control portion 381. For example, the wireless communication portion 385 may transmit the camera image or video data to the wireless communication portion 195 of the display apparatus 100 according to A2DP protocol or another protocol.

According to an embodiment of the present disclosure, the wireless communication portion 385 may transmit (e.g., microphone) sound data provided from the sound processing portion 383 to the wireless communication portion 195 of the display apparatus 100 under the control of the speaker control portion 381. For example, the wireless communication portion 385 may transmit one or more of connection sound characteristic information, surrounding sound information, voice recognition information, voice internet protocol information and the like, which are received (or collected) by the microphone device 350, to the wireless communication portion 195 of the display apparatus 100 according to A2DP protocol or another protocol. For example, the wireless communication portion 385 may be embedded (or built) in the speaker control portion 381 or integrated into the speaker control portion 381.

The storing portion (or speaker-side storing portion) 396 may include an operating system for driving the sound apparatus 300, various software, programs and applications executed according to the operating system, and additional data. The storing portion 396 may include a database in which user information for recognizing a user voice to be received through the microphone device 350 is stored. The storing portion 396 may store input/output signals or data corresponding to driving of each of a wireless communication portion 385, a general-purpose input/output port 375 of the terminal portion 370, and the sound output member 330. For example, the storing portion 396 may include Blue disk (BD), universal serial bus (USB), a non-volatile memory (e.g., ROM), a volatile memory (e.g., RAM, SDRAM), PROM, EPROM, EEPROM, CD-ROM, flexible disk, soft disk, tape, flash memory, a hard disk drive HDD, or a solid-state drive SSD.

The host control portion 191 of the display apparatus 100 according to an embodiment of the present disclosure may receive an identification signal (or authentication signal) transmitted from the sound apparatus 300 through the general-purpose input/output port 185 and may perform the connection (or pairing) operation between the display apparatus 100 and the sound apparatus 300 according to the received identification signal (or authentication signal). For example, since identification information of the sound apparatus 300 is stored in the storing portion 196, the host control portion 191 may identify the received identification signal and the identification signal stored in the storing portion 196 to complete the connection (or pairing) operation between the display apparatus 100 and the sound apparatus 300.

According to an embodiment of the present disclosure, the host control portion 191 may set a sound mode of the display apparatus 100 according to whether the sound apparatus 300 is connected (or paired) with the display apparatus 100 through the general-purpose input/output port 185 or through the wireless communication portion. That is, a sound mode from a plurality of different sound modes is set based on a type of connection (e.g., wired or wireless) that is used to connect the display apparatus 100 and the sound apparatus 300. For example, the external sound apparatus 300 and the sound output apparatuses in the display apparatus 100 may be configured to selectively output sound according to the sound mode. For example, the sound mode may include a plurality of different sound modes such as first to third sound modes. For example, the sound output apparatus 150 at the display apparatus 100 may be configured to output sound according to the first sound mode or third sound mode. The sound output apparatus 150 and the vibration apparatus 170 at the display apparatus 100 may be configured to output sound according to the first sound mode or third sound mode. The external sound apparatus 300 may be configured to output sound according to the first sound mode or second sound mode. Alternatively, the sound output apparatus 150 and the vibration apparatus at the display apparatus 100 may be configured to output sound according to the second sound mode. The external sound apparatus 300 may be configured to output sound according to the third sound mode.

According to an embodiment of the present disclosure, the host control portion 191 may set the display apparatus 100 to the first sound mode when the host control portion 191 is connected (or paired) with the sound apparatus 300 through the general-purpose input/output port 185 and the signal cable 200. That is, the first sound mode is set responsive to the display apparatus 100 and the sound apparatus 300 being connected to each other via the signal cable 200 (e.g., a wire). For example, when the sound apparatus 300 and the display apparatus 100 are connected through the signal cable 200, the sound apparatus 300 and the display apparatus 100 may be automatically connected (or paired). For example, the host control portion 191 may control the sound to be output through each of the display apparatus 100 and the sound apparatus 300 according to the first sound mode. The host control portion 191 or the sound processing portion 193 may generate surround sound data corresponding to the number of surround sound channels according to the first sound mode. For example, the host control portion 191 may output sound from at least one of the sound output apparatus 150 and the vibration apparatus 170 of the display apparatus 100 in accordance with the surround sound data of the first sound mode. As another example, the host control portion 191 may output sound from at least one of the sound output apparatus 150 and the vibration apparatus 170 of the display apparatus 100 in accordance with the stereophonic sound data of the first sound mode. At the same time, the host control portion 191 may control the sound apparatus 300 to output the sound. For example, the first sound mode may be a surround sound mode, 5.1 channel mode, or stereophonic mode. Thus, during the first sound mode the sound apparatus 300 and the internal sound output apparatus of the display apparatus 100 (e.g., at least one of the sound output apparatus 150 and the vibration apparatus 170) output sound.

Figure 5A:
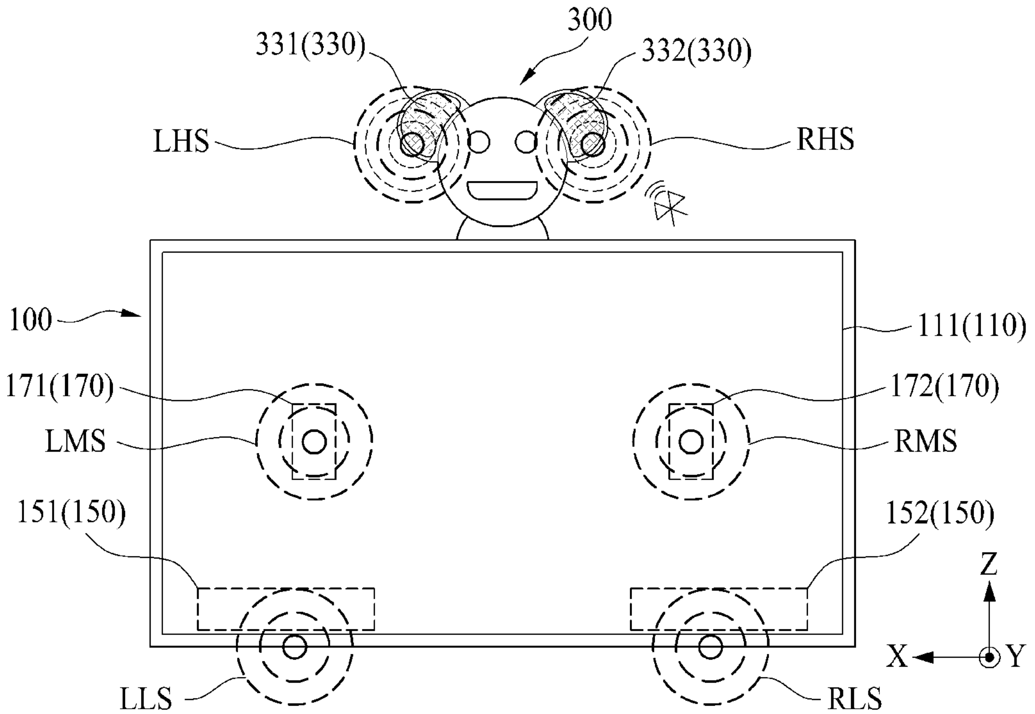
FIG. 5A is a diagram illustrating sound output based on a first sound mode of a display apparatus according to an embodiment of the present disclosure.

According to the first sound mode of an embodiment of the present disclosure, as shown in FIG. 5A, the display apparatus 100 according to an embodiment of the present disclosure may output left lower sound LLS according to the driving of one or more first sound output apparatuses 151 of the sound output apparatus 150 and may output right lower sound RLS according to the driving of one or more second sound output apparatuses 152 of the sound output apparatus 150 based on the surround sound data according to the first sound mode. In addition, the sound apparatus 300 may output left height sound LHS according to the driving of the one or more first speakers 331 and may output right height sound RHS according to the driving of the one or more second speakers 332 based on the surround sound data according to the first sound mode. Accordingly, the display apparatus 100 (or display system) including the sound apparatus 300 may output surround sound (or stereophonic sound) of four channels or more by the left lower sound LLS, the right lower sound RLS, the left height sound LHS, and the right height sound RHS according to the first sound mode.

Furthermore, the display apparatus 100 according to an embodiment of the present disclosure may additionally output left middle sound LMS according to the vibration of the display member 110 by the vibration (or driving) of one or more first vibration apparatuses 171 of the vibration apparatus 170 according to the first sound mode and may output right middle sound RMS according to the vibration of the display member 110 by the vibration (or driving) of one or more second vibration apparatuses 172 of the vibration apparatus 170 according to the first sound mode. Accordingly, the display apparatus 100 (or display system) including the sound apparatus 300 may output surround sound (or stereophonic sound) of six channels or more by the left lower sound LLS, the right lower sound RLS, the left middle sound LMS, the right middle sound RMS, the left height sound LHS, and the right height sound RHS according to the first sound mode.

According to an embodiment of the present disclosure, when the host control portion 191 is not connected (or paired) with the sound apparatus 300 through the general-purpose input/output port 185 and the signal cable 200 but is connected (or paired) with the sound apparatus 300 through the wireless communication portion 195, the display apparatus 100 may be set as the second sound mode. That is, the second sound mode is set responsive to the display apparatus 100 and the sound apparatus 300 being wirelessly connected to each other. The host control portion 191 or the sound processing portion 193 may generate first stereo sound data corresponding to the number of stereo sound channels according to the second sound mode. For example, the host control portion 191 may control the sound output of the display apparatus 100 to be deactivated and may control the sound to be output through the sound apparatus 300 according to the second sound mode. For example, the host control portion 191 deactivates the driving of each of the sound output apparatus 150 and the vibration apparatus 170 of the display apparatus 100 according to the second sound mode. At the same time, the host control portion 191 may control the sound apparatus 300 to output the sound according to the first stereo sound data in the second sound mode. For example, the second sound mode may be a first stereo sound mode, an external stereo sound mode, or an external speaker sound mode. Thus, during the second sound mode the sound apparatus 300 outputs sound but the internal sound output apparatus of the display apparatus 100 (e.g., at least one of the sound output apparatus 150 and the vibration apparatus 170) do not output sound.

Figure 5B:
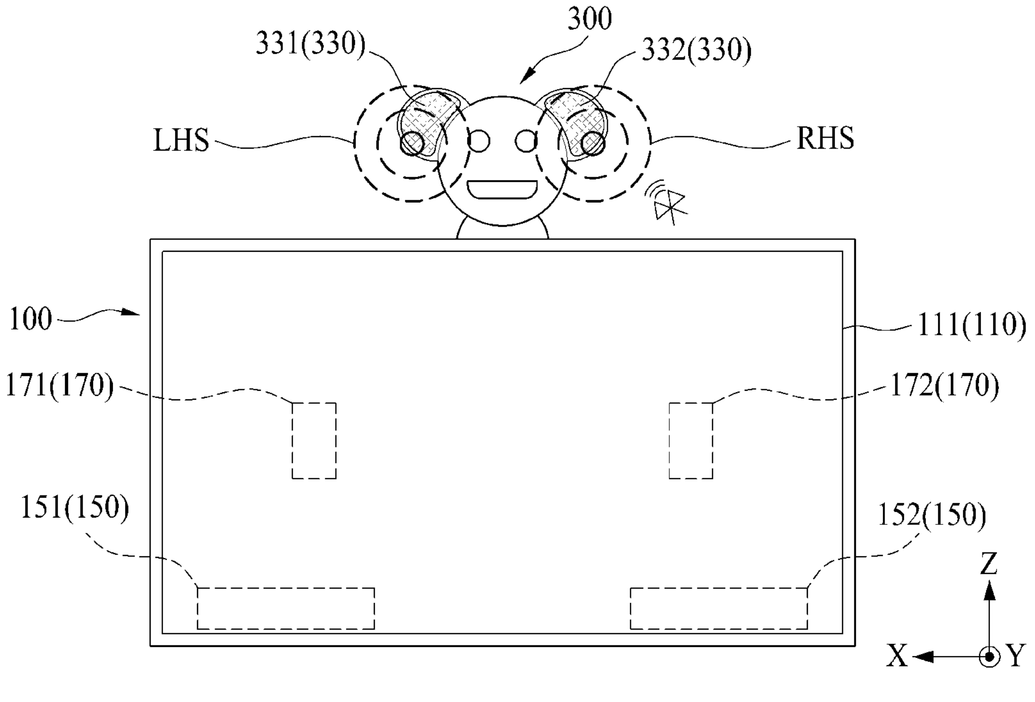
FIG. 5B is a diagram illustrating sound output based on a second sound mode of a display apparatus according to an embodiment of the present disclosure.

According to the second sound mode of the display apparatus 100 according to an embodiment of the present disclosure, as shown in FIG. 5B, the display apparatus 100 may deactivate the driving of the one or more first sound output apparatuses 151 of the sound output apparatus 150 according to the second sound mode, and the sound apparatus 300 may output the left height sound LHS by the driving of the one or more first speakers 331 based on the first stereo sound data according to the second sound mode of the display apparatus 100 and may output the right height sound RHS by the driving of one or more second speakers 332 based on the first stereo sound data according to the second sound mode of the display apparatus 100. Accordingly, the display apparatus 100 (or display system) including the sound apparatus 300 may output stereo sound (or first stereo sound) of two or more channels by the left height sound LHS and the right height sound RHS according to the second sound mode.

According to an embodiment of the present disclosure, the host control portion 191 may set the display apparatus 100 to the third sound mode when the host control portion 191 is not connected (or paired) with the sound apparatus 300 through any of the general-purpose input/output port 185, the signal cable 200, and the wireless communication portion 195. That is, the third sound mode is set responsive to the display apparatus 100 and the sound apparatus 300 not being connected to each other. The host control portion 191 or the sound processing portion 193 may generate second stereo sound data corresponding to the number of stereo sound channels according to the third sound mode. For example, the host control portion 191 may control the sound output of the sound apparatus 300 to be deactivated according to the third sound mode and may output the sound through the display apparatus 100. For example, the host control portion 191 deactivates the driving of the sound apparatus 300 according to the third sound mode and controls the sound to be output from at least one of the sound output apparatus 150 and the vibration apparatus 170 of the display apparatus 100. For example, the third sound mode may be a normal mode, a second stereo sound mode, an internal stereo sound mode, or an internal speaker sound mode. Thus, during the third sound mode the sound apparatus 300 does not output sound and the internal sound output apparatus of the display apparatus 100 (e.g., at least one of the sound output apparatus 150 and the vibration apparatus 170) outputs sound.

Figure 5C:
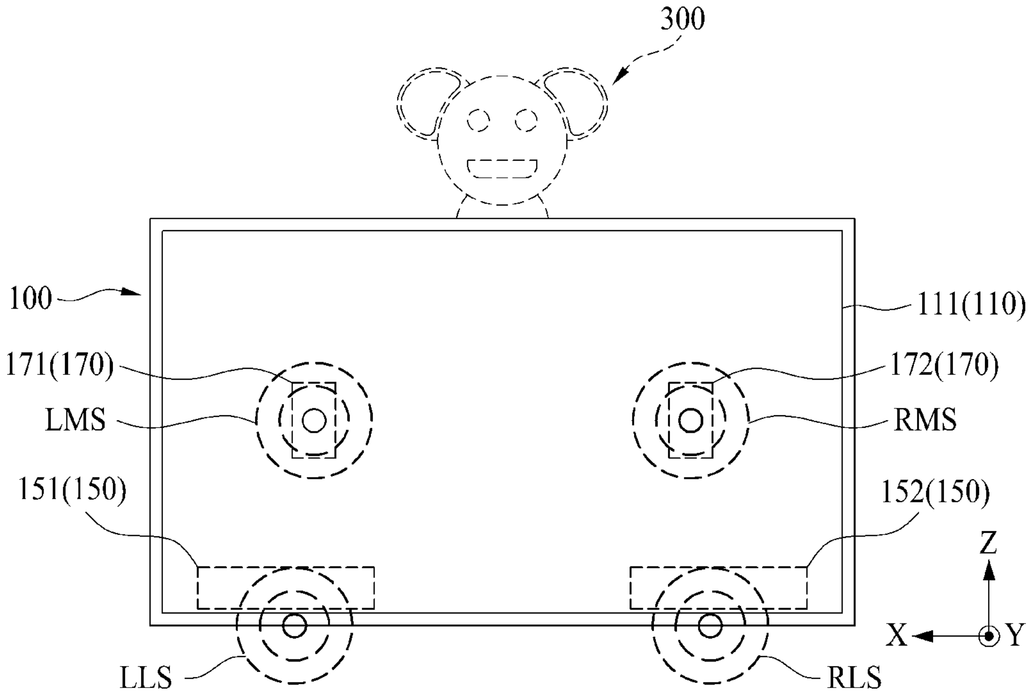
FIG. 5C is a diagram illustrating sound output based on a third sound mode of a display apparatus according to an embodiment of the present disclosure.

According to the third sound mode of the display apparatus 100 according to an embodiment of the present disclosure, as shown in FIG. 5C, the display apparatus 100 may deactivate the driving of the sound apparatus 300 according to the third sound mode, and may output the left lower sound LLS by the driving of one or more first sound output apparatuses 151 of the sound output apparatus 150 based on the second stereo sound data and may output the right lower sound RLS by the driving of one or more second sound output apparatuses 152 of the sound output apparatus 150 based on the second stereo sound data. Accordingly, the display apparatus 100 (or display system) including the sound apparatus 300 may output stereo sound (or second stereo sound) of two or more channels by the left lower sound LLS and the right lower sound RLS according to the third sound mode.

Furthermore, the display apparatus 100 according to an embodiment of the present disclosure may additionally output left middle sound LMS according to the vibration (or driving) of the display member 110 by the vibration of one or more first vibration apparatuses 171 of the vibration apparatus 170 based on the second stereo sound data according to the third sound mode and may output right middle sound RMS according to the vibration of the display member 110 by the vibration (or driving) of one or more second vibration apparatuses 172 of the vibration apparatus 170 based on the second stereo sound data according to the third sound mode. Accordingly, the display apparatus 100 (or display system) including the sound apparatus 300 may output surround sound (or stereophonic sound) of four channels or more by the left lower sound LLS, the right lower sound RLS, the left middle sound LMS, the right middle sound RMS, the left height sound LHS, and the right height sound RHS according to the third sound mode.

According to an embodiment of the present disclosure, the host control portion 191 may read the sound output characteristic information of the connected (or paired) sound apparatus 300 from the storing portion 196 when the display apparatus 100 and the sound apparatus 300 are connected (or paired) with each other and may provide the sound output characteristic information to the sound processing portion 193.

The host control portion 191 according to an embodiment of the present disclosure receives the connection sound characteristic information transmitted from the microphone device 350 of the sound apparatus 300 through the wireless communication portion 195 or the general-purpose input/output port 185 when the display apparatus 100 and the sound apparatus 300 are connected (or paired) with each other, and generates sound correction information for correcting the sound output characteristics of the sound apparatus 300 by analytically comparing the received connection sound characteristic information with the reference connection sound characteristic information stored in the storing portion 196 and then provides the generated sound correction information to the sound processing portion 193.

The sound processing portion 193 may correct and output frequency characteristics and noise characteristics of the sound data based on the sound correction information provided from the host control portion 191, but embodiments of the present disclosure are not limited thereto. For example, the correction of the sound data based on the sound correction information may be performed by the host control portion 191.

The host control portion 191 according to an embodiment of the present disclosure may be configured to receive the sound information transmitted from the sound apparatus 300 through the wireless communication portion 195 or the general-purpose input/output port 185, and to perform the control operation corresponding to the received sound information. For example, the host control portion 191 may be configured to delay the sound data transmitted to the sound apparatus 300 or to correct the frequency characteristics of the sound data based on the received sound information.

Figure 6A:
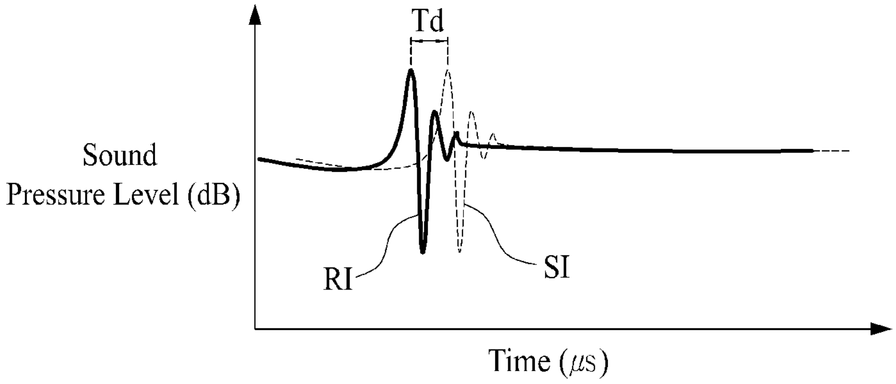
FIG. 6A is a diagram illustrating a sound correction method according to an embodiment in a display apparatus according to an embodiment of the present disclosure.

According to an embodiment of the present disclosure, the sound processing portion 193 or the host control portion 191 compares the sound correction information transmitted from the microphone device 350 of the sound apparatus 300 with the reference connection sound characteristic information, calculates a delay time Td between the sound correction information SI and the reference connection sound characteristic information RI as shown in FIG. 6A, and delays the sound data by the calculated delay time Td.

Figure 6B:
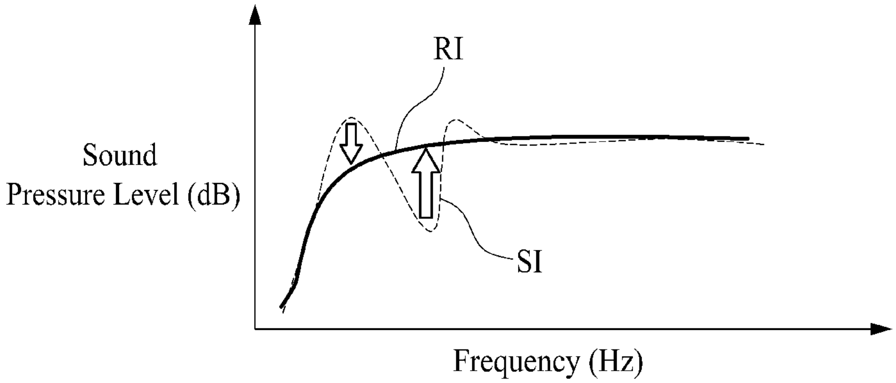
FIG. 6B is a diagram illustrating a sound correction method according to another embodiment in a display apparatus according to an embodiment of the present disclosure.

According to another embodiment of the present disclosure, the sound processing portion 193 or the host control portion 191 may compare the sound correction information transmitted from the microphone device 350 of the sound apparatus 300 with the reference connection sound characteristic information, may calculate a frequency deviation between the sound correction information SI and the reference connection sound characteristic information RI based on the reference connection sound characteristic information RI as shown in FIG. 6B, and may correct the sound data by reflecting the calculated frequency deviation to the sound data.

The host control portion 191 according to an embodiment of the present disclosure may receive the surrounding sound information transmitted from the microphone device 350 of the sound apparatus 300 through the wireless communication portion 195 or the general-purpose input/output port 185, may compare the received surrounding sound information with the optimal sound characteristic information stored in the storing portion 196, may generate sound optimization information for optimizing the sound output characteristics of the sound apparatus 300, and may provide the generated sound optimization information to the sound processing portion 193.

According to an embodiment of the present disclosure, the sound processing portion 193 or the host control portion 191 may correct the sound data so as to have the frequency characteristic corresponding to the sound optimization information generated based on the surrounding sound information transmitted from the microphone device 350 of the sound apparatus 300. For example, the sound processing portion 193 or the host control portion 191 may correct the sound data by calculating the delay time between the surrounding sound information and the sound data as shown in FIG. 6A or may correct the sound data by calculating the frequency characteristic deviation between the surrounding sound information and the sound data as shown in FIG. 6B.

The host control portion 191 according to an embodiment of the present disclosure may receive the sound information including voice recognition information transmitted from the microphone device 350 of the sound apparatus 300 through the wireless communication portion 195 or the general-purpose input/output port 185 and may control the operation of one or more of the display apparatus 100 and the sound apparatus 300 to correspond to the received voice recognition information. For example, the host control portion 191 may perform the control operation such as sound adjustment, power-off of the display apparatus, or power-on of the display apparatus according to the use's voice recognition information.

As described above, the display apparatus 100 and the sound apparatus 300 according to an embodiment of the present disclosure may be connected to or paired with each other through a wired method as well as a wireless method, thereby shortening a connection time and a pairing time between the display apparatus 100 and the sound apparatus 300, and minimizing loss of sound data generated during a connection time and a pairing time between the display apparatus 100 and the sound apparatus 300.

Moreover, the display apparatus 100 according to an embodiment of the present disclosure may selectively output the sound through one or more of the internal sound output apparatus 150, the vibration apparatus 170, and the external sound apparatus 300 based on any one of the first to third sound modes corresponding to one or more of the connection (or paring) with the sound apparatus 300 through the signal cable 200 and general-purpose input/output port 185 and the connection (or pairing) with the sound apparatus 300 through the wireless communication portion 195. Accordingly, the display apparatus 100 according to an embodiment of the present disclosure may provide not only stereo sound but also surround sound or stereophonic sound to a user.

Furthermore, the display apparatus 100 according to an embodiment of the present disclosure may correct the sound quality of sound or may perform the control operation based on the received sound information through the microphone device 350 embedded (or built) in the external sound apparatus 300.

The sound apparatus 300 according to an embodiment of the present disclosure may output the sound or stereo sound corresponding to the sound data transmitted from the display apparatus 100 to the sound output apparatus 150 of the display apparatus 100 or may output the sound together with the display apparatus 100, to thereby provide the stereophonic sound or surround sound to a user or viewer.

The sound apparatus 300 according to an embodiment of the present disclosure may perform real-time correction and real-time optimization of the sound data generated by the display apparatus 100 by providing the sound information received through the microphone device 350 to the display apparatus 100, may perform the control operation corresponding to the user voice, and may perform the voice internet protocol.

The sound apparatus 300 according to an embodiment of the present disclosure may perform the voice internet protocol or closed-circuit television function through the camera device 360, thereby transmitting photographing image information for the surrounding environment to the display apparatus 100 or terminal device of a user in real time.

Figure 7:
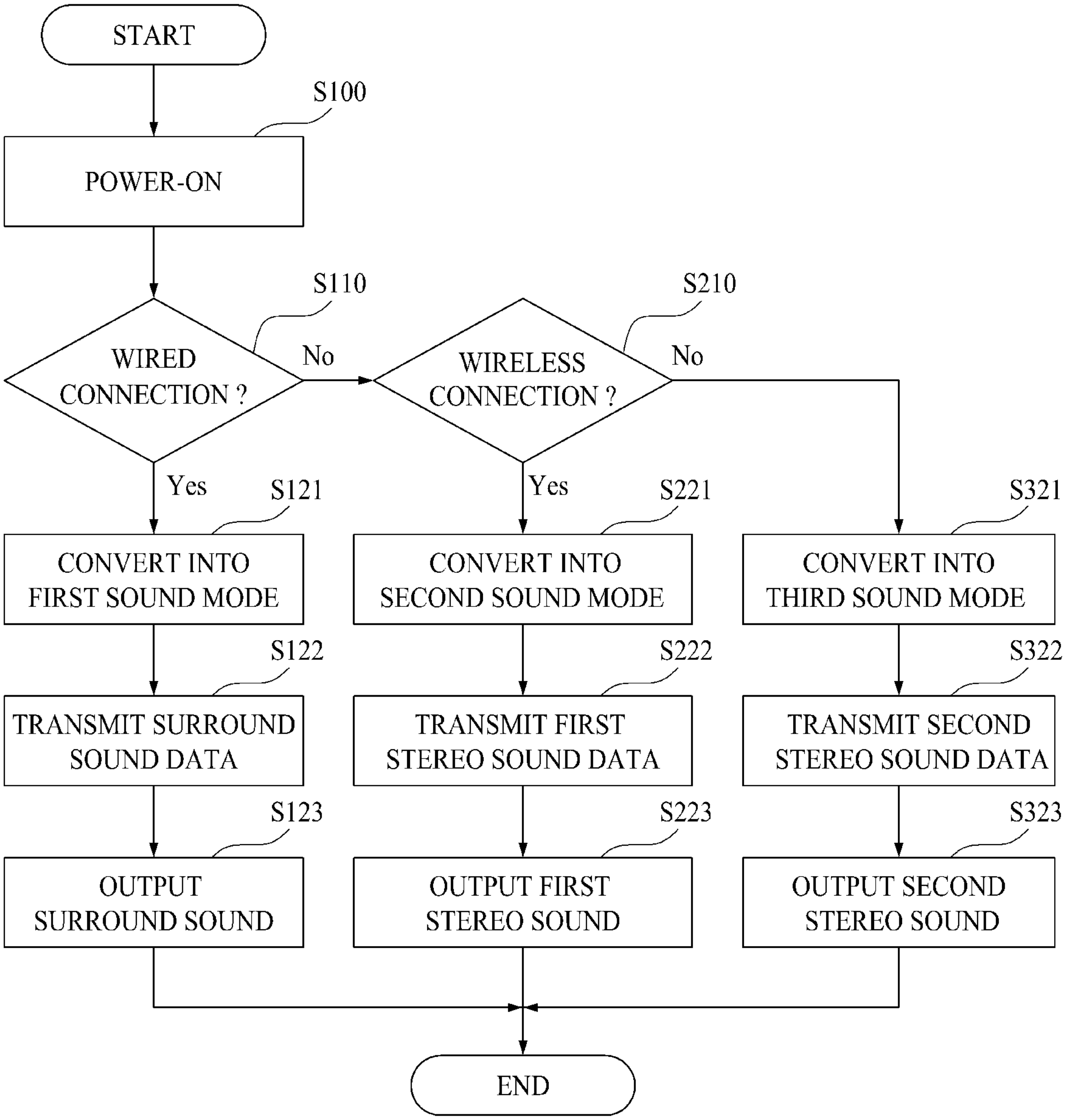
FIG. 7 is a flowchart illustrating a method for driving the display apparatus according to an embodiment of the present disclosure.

FIG. 7 is a flowchart illustrating a method for driving the display apparatus according to an embodiment of the present disclosure. FIG. 7 illustrates a method for driving the display apparatus paired with the sound apparatus according to an embodiment of the present disclosure.

A method for driving the display apparatus paired with the sound apparatus according to an embodiment of the present disclosure will be described with reference to FIGS. 2 and 7. A repeated portion in the method for driving the display apparatus, which is the same as those of FIGS. 1 to 6B, will be omitted or briefly described.

First, the display apparatus 100 is turned-on (powered-on) according to the operation of a user or viewer (S100).

Then, it is determined that the display apparatus 100 is connected (or paired) with the sound apparatus 300 (S110). For example, in the step S110, it may be determined whether the display apparatus 100 is connected (or paired) with the sound apparatus 300 through the general-purpose input/output port 185 and the signal cable 200.

Next, based on the determination result of S110, if the display apparatus 100 is connected (or paired) with the sound apparatus 300 by using a wire ("Yes" of S110), the display apparatus 100 is switched to the first sound mode, and the surround sound is output through both the display apparatus 100 and the sound apparatus 300, whereby the surround sound is provided to a user or viewer (S120).

According to an embodiment of the present disclosure, the step S120 may include steps of converting the display apparatus 100 into the first sound mode (S121), converting the sound data into surround sound data according to the first sound mode and transmitting the surround sound data to the sound apparatus 300 (S122), and outputting the sound through one or more of the sound output apparatus 150 and the vibration apparatus 170 of the display apparatus 100 according to the surround sound data and simultaneously outputting the sound through the sound apparatus 300 (S123).

In the step S122, the surround sound data may be transmitted to the sound apparatus 300 through the signal cable 200 or wireless communication.

In the step S123, as shown in FIG. 5A, the surround sound according to the first sound mode may include the left lower sound LLS and right lower sound RLS respectively output from one or more first sound output apparatuses 151 and one or more second sound output apparatuses 152in the sound output apparatus 150 of the display apparatus 100, and the left height sound LHS and right height sound RHS respectively output from one or more first speakers 331 and one or more second speakers 332 in the sound apparatus 300, whereby the display apparatus 100 (or display system) including the sound apparatus 300 may output the surround sound (or stereophonic sound) of four channels or more according to the first sound mode. Additionally, in the step of S123, the surround sound according to the first sound mode may further include the left middle sound LMS and right middle sound RMS respectively output by the vibration (or driving) of the display member 110 according to the vibration of each of one or more first vibration apparatuses 171 and one or more second vibration apparatuses 172 included in the vibration apparatus 170 of the display apparatus 100, as shown in FIG. 5A, whereby the display apparatus 100 (or display system) including the sound apparatus 300 may output the surround sound (or stereophonic sound) of six channels or more according to the first sound mode.

Then, based on the determination result of S110, if the display apparatus 100 is not connected (or paired) with the sound apparatus 300 by using a wire ("No" of S110), it is determined whether the display apparatus 100 is wirelessly connected (or paired) with the sound apparatus 300. For example, in the step S210, it is determined that the display apparatus 100 is wirelessly connected (or paired) with the sound apparatus 300 through the wireless communication.

Next, based on the determination result of S210, if the display apparatus 100 is wirelessly connected (or paired) with the sound apparatus 300 ("Yes" of S210), the display apparatus 100 is switched to the second sound mode, and the first stereo sound is output through only the sound apparatus 300, thereby providing the stereo sound to a user or viewer (S220).

According to an embodiment of the present disclosure, the step S220 may include steps of switching the display apparatus 100 to the second sound mode (S221), converting the sound data into the first stereo sound data according to the second sound mode and transmitting the first stereo sound data to the sound apparatus 300 (S222), and deactivating the sound output of the vibration apparatus 170 and the sound output apparatus 150 in the display apparatus 100 and simultaneously outputting the first stereo sound through the sound apparatus 300 according to the first stereo sound data (S223).

In the step S222, the first stereo sound data may be transmitted to the sound apparatus 300 through the signal cable 200 or wireless communication.

In the step S223, as shown in FIG. 5B, the first stereo sound according to the second sound mode may include the left height sound LHS and right height sound RHS respectively output from one or more first speakers 331 and one or more second speakers 332 in the sound apparatus 300, whereby the display apparatus 100 (or display system) including the sound apparatus 300 may output the stereo sound of two or more channels according to the second sound mode.

Then, based on the determination result of S210, if the display apparatus 100 is not wirelessly connected (or paired) with the sound apparatus 300 ("No" of S210), the display apparatus 100 is switched to the third sound mode, and the second stereo sound is output through only the display apparatus 100, thereby providing the stereo sound to a user or viewer (S320).

According to an embodiment of the present disclosure, the step S320 may include steps of switching the display apparatus 100 to the third sound mode (S321), converting the sound data into second stereo sound data according to the third sound mode and outputting the second stereo sound data to the sound output apparatus 150 in the display apparatus 100 (S322), and deactivating the sound output of the sound apparatus 300 and simultaneously outputting the second stereo sound through the sound output apparatus 150 according to the second stereo sound data (S323).

In the step S323, the second stereo sound according to the third sound mode may include the left lower sound LLS and right lower sound RLS respectively output from one or more first sound output apparatuses 151 and one or more second sound output apparatuses 152in the sound output apparatus 150 of the display apparatus 100, as shown in FIG. 5C.

According to another embodiment of the present disclosure, in the step S322, the second stereo sound data may be additionally outputted to the vibration apparatus 170 of the display apparatus 100. In this case, in the step S323, the second stereo sound may be output through each of the sound output apparatus 150 and the vibration apparatus 170 of the display apparatus 100. For example, as shown in FIG. 5C, the second stereo sound according to the third sound mode may include the left lower sound LLS and right lower sound RLS respectively output from one or more first sound output apparatuses 151 and one or more second sound output apparatuses 152in the sound output apparatus 150 of the display apparatus 100, and the left middle sound LMS and right middle sound RMS output by the vibration of the display member 110 according to the vibration of each of one or more first vibration apparatuses 171 and one or more second vibration apparatuses 172 in the vibration apparatus 170.

According to another embodiment of the present disclosure, in the step S322, the sound data according to the third sound mode may be converted into surround sound data and may be output to each of the sound output apparatus 150 and the vibration apparatus 170 in the display apparatus 100. Accordingly, in the step S323, the surround sound may be output instead of the second stereo sound. For example, as shown in FIG. 5C, the surround sound according to the third sound mode may include the left lower sound LLS and right lower sound RLS respectively output from one or more first sound output apparatuses 151 and one or more second sound output apparatuses 152in the sound output apparatus 150 of the display apparatus 100, and the left middle sound LMS and right middle sound RMS output according to the vibration (or driving) of the display member 110 by the vibration of one or more first vibration apparatuses 171 and one or more second vibration apparatuses 172 in the vibration apparatus 170. Therefore, the display apparatus 100 (or display system) including the sound apparatus 300 may output the surround sound (or stereophonic sound) of four channels or more according to the third sound mode.

Accordingly, the method for driving the display apparatus 100 according to an embodiment of the present disclosure may provide not only stereo sound but also surround sound or stereophonic sound to a user through one or more of the internal sound output apparatus 150, the vibration apparatus 170, and the external sound apparatus 300 based on any one of the first to third sound modes corresponding to one or more of the wired connection and the wireless connection between the display apparatus 100 and the sound apparatus 300.

A display apparatus and a method for driving thereof, and a sound apparatus and a display apparatus including the same according to an embodiment of the present disclosure will be described below.

A display apparatus according to an embodiment of the present disclosure may comprise a display member including a display panel having a plurality of pixels that are configured to display an image, a sound output apparatus configured to output sound, and an input/output interface configured to connect an external sound apparatus to the display member via a wire, the sound output apparatus and the external sound apparatus may be configured to output sound according to a sound mode responsive to the external sound apparatus being connected to the input/output interface via the wire.

According to one or more embodiments of the present disclosure, the input/output interface may include a general-purpose input/output port that is connected to the external sound apparatus via the wire.

According to one or more embodiments of the present disclosure, the general-purpose input/output port may be configured to transmit an authentication signal of the display apparatus to the external sound apparatus and receive an authentication signal from the external sound apparatus to pair together the display apparatus and the external sound apparatus.

According to one or more embodiments of the present disclosure, the display apparatus may further comprise a host control circuit connected to the input/output interface, and a wireless communication circuit that is configured to wirelessly connect to the external sound apparatus under a control of the host control circuit, the input/output interface configured to transmit sound data to the external sound apparatus via the wire and the wireless communication circuit may be configured to wirelessly transmit the sound data to the external sound apparatus.

According to one or more embodiments of the present disclosure, the sound data may be wirelessly transmitted to the external sound apparatus using Advanced Audio Distribution Protocol of Bluetooth.

According to one or more embodiments of the present disclosure, the host control circuit may be configured to receive sound information transmitted from the external sound apparatus through the input/output interface via the wire or wirelessly receive the sound information transmitted from the external sound apparatus via the wireless communication circuit and may perform a control operation corresponding to the received sound information.

According to one or more embodiments of the present disclosure, the host control circuit may be configured to delay the sound data transmitted to the external sound apparatus based on the received sound information or may correct a frequency characteristic of the sound data based on the received sound information.

According to one or more embodiments of the present disclosure, the sound mode may include a first sound mode during which the external sound apparatus and the sound output apparatus are configured to output sound responsive to the external sound apparatus and the input/output interface being connected via the wire, a second sound mode during which the external sound apparatus is configured to output sound but the sound output apparatus does not output sound responsive to the external sound apparatus and the display apparatus being wirelessly connected through the wireless communication circuit, and a third sound mode during which the sound output apparatus is configured to output sound but the external sound apparatus does not output sound responsive to the external sound apparatus and the display apparatus not connected to each other.

According to one or more embodiments of the present disclosure, the display apparatus may further comprise a rear cover at a rear surface of the display member, and a vibration apparatus configured to vibrate the display member or the rear cover to output sound during at least one of the first sound mode and the third sound mode.

A sound apparatus according to an embodiment of the present disclosure may comprise a stand portion, a housing connected to the stand portion, a sound output member disposed within the housing, the sound output member including one or more speakers, and a general-purpose input/output port configured to connected to a display apparatus through a wire, the sound apparatus and the display apparatus may be each configured to output sound responsive to the display apparatus being connected to the general-purpose input/output port through the wire.

According to one or more embodiments of the present disclosure, the sound apparatus may further comprise a speaker control circuit that is connected to the general-purpose input/output port, and a wireless communication circuit that is configured to be wirelessly connected to the display apparatus under a control of the speaker control circuit, the speaker control circuit may be configured to receive sound data transmitted from the display apparatus to the sound apparatus through the general-purpose input/output port or wirelessly receive the sound data transmitted from the display apparatus to the sound apparatus through the wireless communication circuit.

According to one or more embodiments of the present disclosure, the sound apparatus may further comprise a microphone device configured to generate sound information responsive to receiving sound from a surrounding of the sound apparatus; and a camera device configured to generate photograph image information in real time by photographing the surrounding of the sound apparatus, the sound information may be transmitted to the display apparatus through the general-purpose input/output port or the wireless communication circuit, and the photograph image information may be transmitted to the display apparatus through the general-purpose input/output port or the wireless communication circuit or may be transmitted to a user's terminal device according to a voice internet protocol through the wireless communication circuit.

According to one or more embodiments of the present disclosure, the sound apparatus may further comprise a microphone device configured to generate sound information responsive to receiving sound from a surrounding of the sound apparatus, and a camera device configured to generate photograph image information in real time by photographing the surrounding of the sound apparatus, the housing may include a first protruding portion that protrudes in a first direction from a first side portion of the housing, and a second protruding portion that protrudes in a second direction from a second side portion of the housing that is opposite to the first side portion, and one or more speakers may be disposed at each of the first protruding portion and the second protruding portion of the housing.

According to one or more embodiments of the present disclosure, the housing may further include a microphone hole for exposing a portion of the microphone device, and a camera hole for exposing a lens of the camera device.

According to one or more embodiments of the present disclosure, the housing, the first protruding portion, the second protruding portion, the microphone hole, and the camera hole may be arranged in a shape of a head of an animal.

A method for driving a display apparatus configured to be connected to an external sound apparatus according to an embodiment of the present disclosure may comprise determining whether the display apparatus is connected to the external sound apparatus by a wire or is wirelessly connected to the external sound apparatus, setting a sound mode that is based on whether the display apparatus is connected to the external sound apparatus by the wire or is wirelessly connected to the external sound apparatus, and outputting sound through one or more of the external sound apparatus and a sound output apparatus at the display apparatus according to the sound mode.

According to one or more embodiments of the present disclosure, setting the sound mode may comprise setting a first sound mode during which the external sound apparatus and the sound output apparatus are configured to output sound responsive to the external the sound apparatus and the display apparatus being connected by the wire, setting a second sound mode during which the external sound apparatus is configured to output sound but the sound output apparatus does not output sound responsive to the external sound apparatus and the display apparatus being wirelessly connected, and setting a third sound mode during which the sound output apparatus is configured to output sound but the external sound apparatus does not output sound responsive to the display apparatus and the external sound apparatus not being connected to each other.

According to one or more embodiments of the present disclosure, during the first sound mode sound data may be transmitted from the display apparatus to the external sound apparatus via the wire and during the second sound mode the sound data is wirelessly transmitted from the display apparatus to the external sound apparatus.

According to one or more embodiments of the present disclosure, the sound data may be wirelessly transmitted through Bluetooth or Advanced Audio Distribution Protocol A2DP protocol of Bluetooth.

According to one or more embodiments of the present disclosure, the display apparatus may include a display member including a display panel, a rear cover at a rear surface of the display member, and a vibration apparatus configured to vibrate the display member or the rear cover, and outputting sound may further comprise outputting sound through the vibration of the display member or vibration of the rear cover responsive to the vibration of the vibration apparatus during at least one of the first sound mode and the third sound mode.

A display system according to an embodiment of the present disclosure may comprise a display apparatus including an internal sound output apparatus configured to output sound and a display panel having a plurality of pixels that are configured to display an image, and an external sound apparatus that is external to the display apparatus and configured to be connected to the display apparatus, the external sound apparatus configured to output sound, at least one of the internal sound output apparatus and the external sound apparatus may be configured to output sound according to one of a plurality of different sound modes based on a type of connection used to connect the external sound apparatus to the display apparatus.

According to one or more embodiments of the present disclosure, the plurality of different sound modes may comprise a first sound mode during which the external sound apparatus and the internal sound output apparatus output sound responsive to the external sound apparatus and the display apparatus being connected by a wire, setting a second sound mode during which the external sound apparatus is configured to output sound but the internal sound output apparatus does not output sound responsive to the external sound apparatus and the display apparatus being wirelessly connected, and setting a third sound mode during which the internal sound output apparatus is configured to output sound but the external sound apparatus does not output sound responsive to the display apparatus and the external sound apparatus not being connected to each other.

According to one or more embodiments of the present disclosure, the display apparatus further may comprise an input/output interface configured to connect the external sound apparatus and the display apparatus via the wire, and a wireless communication circuit that is configured to wirelessly connect the external sound apparatus and the display apparatus.

According to one or more embodiments of the present disclosure, the external sound apparatus may comprise a stand, a housing connected to the stand, the housing including a first protruding portion that protrudes in a first direction from a first side portion of the housing and a second protruding portion that protrudes in a second direction from a second side portion of the housing that is opposite to the first side portion, a first speaker in the first protruding portion, and a second speaker in the second protruding portion.

According to one or more embodiments of the present disclosure, the housing may further comprise a plurality of holes including a first hole and a second hole, a microphone device within the first hole, and a camera device within the second hole.

A display apparatus according to an embodiment of the present disclosure may comprise a display member including a display panel having a plurality of pixels configured to display an image, a sound output apparatus configured to output sound; and a communication portion connected to an external sound apparatus, the sound output apparatus and the sound apparatus may be configured to selectively output sound by a sound mode according to a connection situation between the sound apparatus and the communication portion.

According to one or more embodiments of the present disclosure, the communication portion may include an input/output portion including a general-purpose input/output port connected to the sound apparatus by wire.

According to one or more embodiments of the present disclosure, the communication portion may include a wireless communication portion wirelessly connected to the sound apparatus.

According to one or more embodiments of the present disclosure, the display apparatus may further comprise a host control portion connected to the input/output portion, the input/output portion may transmit sound data to the sound apparatus.

According to one or more embodiments of the present disclosure, the sound data may be transmitted through Bluetooth.

A display apparatus according to an embodiment of the present disclosure may comprise a stand portion, a housing connected to the stand portion, a sound output member disposed at the housing and configured to include one or more speakers, and a communication portion connected to the display apparatus.

According to one or more embodiments of the present disclosure, the communication portion may include a general-purpose input/output port connected to the display apparatus through a wire.

According to one or more embodiments of the present disclosure, the communication portion may include a wireless communication portion wirelessly connected to the display apparatus.

According to one or more embodiments of the present disclosure, the display apparatus may further comprise a speaker control portion, the wireless communication portion may be wirelessly connected to the display apparatus under the control of the speaker control portion, the speaker control portion may be configured to receive sound data transmitted from the display apparatus through the wireless communication portion.

According to one or more embodiments of the present disclosure, the display apparatus may further comprise a camera device for generating photographed image information by photographing the surroundings, the photographing image information may be transmitted to a user's terminal device according to a voice internet protocol through the wireless communication portion.

It will be apparent to those skilled in the art that various modifications and variations can be made in the present disclosure without departing from the scope of the disclosures. Thus, it is intended that the present disclosure covers the modifications and variations of this disclosure provided they come within the scope of the appended claims and their equivalents.

What is claimed is:

1. A display apparatus comprising:

a display member including a display panel having a plurality of pixels that are configured to display an image;

a rear cover at a rear surface of the display member;

a vibration apparatus configured to vibrate the display member or the rear cover;

a sound output apparatus configured to output sound; and an input/output interface configured to connect an external sound apparatus to the display member via a wire, wherein one or more of the sound output apparatus, the external sound apparatus, and the display member are configured to output sound according to a sound mode, wherein the sound mode includes:

a first sound mode during which the external sound apparatus and the sound output apparatus are configured to simultaneously output surround sound responsive to the external sound apparatus and the input/output interface being connected via the wire;

a second sound mode during which the external sound apparatus is configured to output sound but the sound output apparatus does not output sound responsive to the external sound apparatus and display apparatus being connected via wireless communication; and a third sound mode during which the sound output apparatus is configured to output sound but the external sound apparatus does not output sound responsive to the external sound apparatus and the display apparatus not being connected to each other, and wherein the vibration apparatus is configured to vibrate the display member or the rear cover to output sound during at least one of the first sound mode and the third sound mode.

2. The display apparatus of claim 1, wherein the input/output interface includes a general-purpose input/output port that is connected to the external sound apparatus via the wire.

3. The display apparatus of claim 2, wherein the general-purpose input/output port is configured to transmit an authentication signal of the display apparatus to the external sound apparatus and receive an authentication signal from the external sound apparatus to pair together the display apparatus and the external sound apparatus.

4. The display apparatus of claim 1, further comprising:

a host control circuit connected to the input/output interface; and a wireless communication circuit that is configured to wirelessly connect to the external sound apparatus under a control of the host control circuit, wherein the input/output interface is configured to transmit sound data to the external sound apparatus via the wire and the wireless communication circuit is configured to wirelessly transmit the sound data to the external sound apparatus.

5. The display apparatus of claim 4, wherein the sound data is wirelessly transmitted to the external sound apparatus using Advanced Audio Distribution Protocol of Bluetooth.

6. The display apparatus of claim 4, wherein the host control circuit is configured to receive sound information transmitted from the external sound apparatus through the input/output interface via the wire or wirelessly receive the sound information transmitted from the external sound apparatus via the wireless communication circuit and perform a control operation corresponding to the received sound information.

7. The display apparatus of claim 6, wherein the host control circuit is configured to delay the sound data transmitted to the external sound apparatus based on the received sound information or correct a frequency characteristic of the sound data based on the received sound information.

8. The display apparatus of claim 1, wherein in the first sound mode, the display apparatus is configured to output height sounds through the external sound apparatus, middle sounds by vibrating the display member using the vibration apparatus, and lower sounds through the sound output apparatus.

9. A sound apparatus comprising:

a stand portion;

a housing connected to the stand portion;

a sound output member disposed within the housing, the sound output member including one or more speakers; and a general-purpose input/output port configured to be connected to a display apparatus through a wire, wherein the display apparatus includes:

a display panel having a plurality of pixels;

a rear cover at a rear surface of the display panel;

a vibration apparatus configured to vibrate the display panel or the rear cover; and a sound output apparatus configured to output sound, wherein one or more of the sound apparatus, the sound output apparatus, and the display panel are configured to output sound according to a sound mode, wherein the sound mode includes:

a first sound mode during which the one or more speakers and the sound output apparatus are configured to simultaneously output surround sound responsive to the display apparatus and the general-purpose input/output port being connected via the wire;

a second sound mode during which the one or more speakers are configured to output sound but the sound output apparatus does not output sound responsive to the display apparatus and the general-purpose input/output port being connected via wireless communication; and a third sound mode during which the sound output apparatus is configured to output sound but the one or more speakers does not output sound responsive to the display apparatus and the general-purpose input/output port not being connected to each other, and wherein the vibration apparatus is configured to vibrate the display panel or the rear cover to output sound during at least one of the first sound mode and the third sound mode.

10. The sound apparatus of claim 9, further comprising:

a speaker control circuit that is connected to the general-purpose input/output port; and a wireless communication circuit that is configured to be wirelessly connected to the display apparatus under a control of the speaker control circuit, wherein the speaker control circuit is configured to receive sound data transmitted from the display apparatus to the sound apparatus through the general-purpose input/output port or wirelessly receive the sound data transmitted from the display apparatus to the sound apparatus through the wireless communication circuit.

11. The sound apparatus of claim 10, further comprising:

a microphone device configured to generate sound information responsive to receiving sound from a surrounding of the sound apparatus; and a camera device configured to generate photograph image information in real time by photographing the surrounding of the sound apparatus, wherein the sound information is transmitted to the display apparatus through the general-purpose input/output port or the wireless communication circuit, and wherein the photograph image information is transmitted to the display apparatus through the general-purpose input/output port or the wireless communication circuit or is transmitted to a user's terminal device according to a voice internet protocol through the wireless communication circuit.

12. The sound apparatus of claim 10, further comprising:

a microphone device configured to generate sound information responsive to receiving sound from a surrounding of the sound apparatus; and a camera device configured to generate photograph image information in real time by photographing the surrounding of the sound apparatus, wherein the housing includes:

a first protruding portion that protrudes in a first direction from a first side portion of the housing; and a second protruding portion that protrudes in a second direction from a second side portion of the housing that is opposite to the first side portion, and wherein one or more speakers are disposed at each of the first protruding portion and the second protruding portion of the housing.

13. The sound apparatus of claim 12, wherein the housing further comprises:

a microphone hole that exposes a portion of the microphone device; and a camera hole that exposes a lens of the camera device.

14. The sound apparatus of claim 13, wherein the housing, the first protruding portion, the second protruding portion, the microphone hole, and the camera hole are arranged in a shape of a head of an animal.

15. The sound apparatus of claim 9, wherein in the first sound mode, the sound apparatus is configured to output height sounds through the one or more speakers, middle sounds by vibrating the display panel using the vibration apparatus, and lower sounds through the sound output apparatus.

16. A method for driving a display apparatus configured to be connected to an external sound apparatus, the method comprising:

determining whether the display apparatus is connected to the external sound apparatus by a wire or is wirelessly connected to the external sound apparatus;

setting a sound mode that is based on whether the display apparatus is connected to the external sound apparatus by the wire or is wirelessly connected to the external sound apparatus; and outputting sound through one or more of the external sound apparatus, a sound output apparatus at the display apparatus, and a display panel vibrating according to a vibration of a vibration apparatus disposed at a rear surface of the display panel according to the sound mode, wherein setting the sound mode comprises:

setting a first sound mode during which the external sound apparatus and the sound output apparatus are configured to simultaneously output surround sound responsive to the external sound apparatus and the display apparatus being connected by the wire;

setting a second sound mode during which the external sound apparatus is configured to output sound but the sound output apparatus does not output sound responsive to the external sound apparatus and the display apparatus being connected via wireless communication; and setting a third sound mode during which the sound output apparatus is configured to output sound but the external sound apparatus does not output sound responsive to the display apparatus and the external sound apparatus not being connected to each other, wherein the vibration apparatus is configured to vibrate the display panel or a rear cover at the rear surface of the display panel to output sound during at least one of the first sound mode and the third sound mode, and wherein outputting sound further comprises outputting sound through the vibration of the display panel or vibration of the rear cover responsive to vibration of the vibration apparatus during at least one of the first sound mode and the third sound mode.

17. The method of claim 16, wherein:

during the first sound mode, sound data is transmitted from the display apparatus to the external sound apparatus via the wire; and during the second sound mode, the sound data is wirelessly transmitted from the display apparatus to the external sound apparatus.

18. The method of claim 17, wherein the sound data is wirelessly transmitted through Bluetooth.

19. The method of claim 16, wherein in the first sound mode, the display apparatus is configured to output height sounds through the external sound apparatus, middle sounds by vibrating the display panel using the vibration apparatus, and lower sounds through the sound output apparatus.

20. A display system comprising:

a display apparatus including an internal sound output apparatus configured to output sound and a display panel having a plurality of pixels that are configured to display an image; and an external sound apparatus that is external to the display apparatus and configured to be connected to the display apparatus, the external sound apparatus configured to output sound, wherein at least one of the internal sound output apparatus, the external sound apparatus, and the display panel is configured to output sound according to one of a plurality of different sound modes based on a type of connection used to connect the external sound apparatus to the display apparatus, wherein the display apparatus further includes a rear cover at a rear surface of the display panel, and a vibration apparatus configured to vibrate the display panel or the rear cover, wherein the plurality of different sound modes comprise:

a first sound mode during which the external sound apparatus and the internal sound output apparatus simultaneously output surround sound responsive to the external sound apparatus and the display apparatus being connected by a wire;

a second sound mode during which the external sound apparatus is configured to output sound but the internal sound output apparatus does not output sound responsive to the external sound apparatus and the display apparatus being connected via wireless communication; and a third sound mode during which the internal sound output apparatus is configured to output sound but the external sound apparatus does not output sound responsive to the display apparatus and the external sound apparatus not being connected to each other, and wherein the vibration apparatus is configured to vibrate the display panel or the rear cover to output sound during at least one of the first sound mode and the third sound mode.

21. The display system of claim 20, wherein the display apparatus further comprises:

an input/output interface configured to connect the external sound apparatus and the display apparatus via the wire; and a wireless communication circuit that is configured to wirelessly connect the external sound apparatus and the display apparatus.

22. The display system of claim 20, wherein the external sound apparatus comprises:

a stand;

a housing connected to the stand, the housing including a first protruding portion that protrudes in a first direction from a first side portion of the housing and a second protruding portion that protrudes in a second direction from a second side portion of the housing that is opposite to the first side portion;

a first speaker in the first protruding portion; and a second speaker in the second protruding portion.

23. The display system of claim 22, wherein the housing further comprises:

a plurality of holes including a first hole and a second hole;

a microphone device within the first hole; and a camera device within the second hole.

24. The display system of claim 20, wherein in the first sound mode, the display system is configured to output height sounds through the external sound apparatus, middle sounds by vibrating the display panel using the vibration apparatus, and lower sounds through the sound output apparatus.

* * * * *